US005995985A

United States Patent [19]
Cai

[11] Patent Number: 5,995,985
[45] Date of Patent: Nov. 30, 1999

[54] INFORMATION MANAGEMENT SYSTEM WITH IMPROVED METHODS AND INTERFACE FOR PRINTING DATA

[75] Inventor: Yunming Cai, Campbell, Calif.

[73] Assignee: Starfish Software, Inc., Scotts Valley, Calif.

[21] Appl. No.: 08/558,684

[22] Filed: Nov. 16, 1995

[51] Int. Cl.[6] .................................................. G06F 17/21
[52] U.S. Cl. ............................................................ 707/507
[58] Field of Search .................................... 395/766–769, 395/784, 613, 788, 789; 707/505–508

[56] References Cited

U.S. PATENT DOCUMENTS

| | | | |
|---|---|---|---|
| 4,928,229 | 5/1990 | Teraoka et al. | 364/464.24 |
| 5,091,868 | 2/1992 | Pickens et al. | 395/767 |
| 5,241,464 | 8/1993 | Greulich et al. | 395/226 |
| 5,487,141 | 1/1996 | Cain et al. | 395/135 |
| 5,544,285 | 8/1996 | Glaser et al. | 395/767 |
| 5,559,934 | 9/1996 | Ogura et al. | 395/117 |
| 5,563,998 | 10/1996 | Yaksich et al. | 395/768 |
| 5,563,999 | 10/1996 | Yaksich et al. | 395/768 |
| 5,608,898 | 3/1997 | Turpin et al. | 395/768 |
| 5,615,316 | 3/1997 | Imai et al. | 395/117 |
| 5,621,864 | 4/1997 | Benade et al. | 395/117 |

OTHER PUBLICATIONS

*JetForm Design Reference Manual*, Version 4.1, JetForm Corp., pp. 1–196, Jul. 1995.
Kearl et al., "JetForm 4.0". *LAN Times*, v. 12, n. 4, p. 68(2), Feb. 27, 1995.
Taschek, "New report writers provide improved access to data: trio offers specialized tools", *PC Week*, v. 12, n. 5, p. 81(4), Feb. 6, 1995.
Frank, "R&R Report Writer 6.0; Crystal (Reports 4.0)", *DBMS*, v. 8, n. 10, p. 32(5), Sep. 1995.
Binns, "Delphi delivers the right answer", n. 254, p. 80(6), Mar. 8, 1995.
*Reflex® Tutorials & Sample Applications,* Borland Int'l, Inc., pp. 180–194, Jan. 1989.
*Reflex® User's Guide,* Borland Int'l, Inc., pp. 160–164, Jan. 1989.
"R&R Report Writer Xbase Edition", *Computer Select*, Software Product Specification, Dec. 1995.
"JetForm–Design v. 4.1", *Computer Select*, Software Product Specification, Dec. 1995.
Petzold, C., *Programming Windows*, Second Edition, Microsoft Press, Chapter 15: Using the Printer, pp. 715–773, Jan. 1990.

Primary Examiner—Joseph H. Feild
Attorney, Agent, or Firm—John A. Smart

[57] ABSTRACT

A system providing a Print Manager having a Form Designer which assists a user with mapping user data (e.g., "cardfile" or database data) onto a formatted output, such as a commercial form, is described. During system operation, the user employs the Form Designer as a free-hand tool for placing fields and other information anywhere on a form (e.g., label) in a WYSIWYG ("what you see is what you get") fashion. In this manner, the user can create a content description which describes how contents (i.e., user data) are laid out. The system maintains, independent of the content descriptions, a set of templates which define print styles or layouts for particular forms, such as envelopes, address labels, and the like. The content description, once defined, can be applied against various templates in a generic fashion. An interface is provided which allows the user to cycle through various templates, with the content description being automatically applied against each template.

23 Claims, 23 Drawing Sheets

INFORMATION MANAGEMENT SYSTEM WITH IMPROVED METHODS AND INTERFACE FOR PRINTING DATA

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to the task of generating a hard copy or "printout" in such environments.

With the advent of the personal computer, the use of computer systems is becoming increasingly prevalent in everyday life. Today, computers can be seen on the desktops of most business professionals. Running software applications such as word processors and spreadsheets, for example, even the average business professional can realize substantial productivity gains. Besides the business environment, computers can also be found in wide use both at home and at school.

In practically all computer applications, the user eventually needs a "printout" of some type. Such printouts or hard copies may take the form of paper printouts, slides, photos, and the like. Desktop users, in particular, prefer to print out information into one of a number of commercially-available formats, including address book formats (e.g., Daytimer), label formats (e.g., Avery), envelopes, and the like. Expectedly, one finds that present-day application software, particularly word processors and PIMs (Personal Information Managers), include the capability to output user data to pre-defined formats, such as those described above.

The present-day approach to the task of printing or outputting information within the constraints of a pre-defined format has distinct disadvantages, however. The problem may be viewed as follows. For any printing task or job, a system must contend with three issues: (1) the actual contents (i.e., the actual user data), (2) how the contents are to be laid out in the final printout, and (3) how individual items within the data contents are repeated. The third item concerns the repeating groups of items to be printed to a sheet of labels—how the individual groups are laid out.

In present day products the user is constrained in how he or she can lay out information in, for example, a label printout. Both WordPerfect™ for Windows and Ecco™ Pro are typical in this regard. Although each product provides the flexibility to include certain fields (i.e., define a repeating group) for a label printout, the user really has no free hand at specifying how the contents are laid out. In the instance of Ecco Pro, for example, pre-defined templates are provided which basically mandate the layout of the contents. The user is constrained to work within these format pre-defined by the vendor. Quite simply, the user does not have the flexibility to place information content in the layout anywhere he or she really wants.

Additionally, present day systems compromise the actual layout of the labels. For instance, certain commercial formats require data to be printed in a mirror fashion. Here, the page must be, in effect, "flipped over" to print the mirror image. Present-day systems, namely word processors and label-printing programs, do not support this functionality. Part of the problem of these programs is that they do not store (i.e., as their own native data) information about the content which is to be rendered on a label, address book, or the like. Instead, the user data is imported at final print time, for example, via a mail merge operation. This greatly restricts the ability of the user to adjust the layout of the contents since, beforehand, it is not known exactly what kind of data will be received upon import. Using a special envelope-printing function, for instance, the user might set out a very nice layout for an envelope, but at import/print time the actual data received might be too much or too little for the user's design.

What is needed is a system with interface and methods which give users the flexibility to choose how contents are laid out, despite the fact that the actual contents might not be known beforehand. More particularly, such a system should provide the user with the ability to position content in a free-form manner, yet have that data printed out in the appropriate manner for the target commercial form.

SUMMARY OF THE INVENTION

The present invention recognizes that users need flexibility in choosing how their data (i.e., contents) are laid out in a formatted printout (e.g., label), despite the fact that the actual contents might not be known beforehand. The system provides a Print Manager having a Form Designer which assists the user with mapping the user data (e.g., "cardfile" or database data) onto a formatted output, such as a commercial form. The Form Designer is a free-hand tool—allowing the user to place fields and other information anywhere on a form (e.g., label) in a WYSIWYG ("what you see is what you get") fashion, using drag-and-drop methodology.

In operation, the user selects a "Print Labels" option, for invoking a Print Dialog. The Print Dialog provides a preferred interface for the user. The Dialog includes ordered steps, separated into separate regions, which the user follows to complete the task. One region allows the user to specify the data to be printed, such as the current card, selected cards, all cards, cards of a particular index range, or the like. Another region allows the user to select a particular style template (e.g., Avery 5267 return address label); feedback is provided by a preview window. A third region allows the user to specify a layout. Here, the user can choose in a free-hand manner how and where contents are to be printed.

Actual content layout is specified by invoking a Setup Contents Dialog. The Dialog includes a work surface having an active region. The active region indicates the current printable region for the currently selected output format (e.g., Avery 5267). Starting with an empty form (i.e., empty active region), the user adds objects to the form, using Button Tools for adding card fields, text objects, graphics, and a stamp. For instance, the user can select fields from the underlying data (e.g., "cardfile" or database), for including them in the form or label to be printed. In this manner, the user can easily select fields to be included in the final printout. In a similar fashion, the user places text objects, graphics, and stamps on the form. All objects can be positioned and modified in a free-form manner: the user can treat each object graphically, including using drag and drop technique and object resizing/repositioning technique. Once the user is satisfied with the arrangement of contents on the label, the user can save the content setup as a "content description." In effect, the user is given complete freedom to "paint" the label with objects, which may then be saved as a content description.

The system maintains, independent of the content descriptions, a set of templates which define print styles or layouts for particular forms, such as envelopes, address labels, and the like. The content description, once created (e.g., by the user or automatically), can be applied against various templates in a generic fashion. The user can cycle through various templates, with the content description being automatically applied against each template. Moreover, the user can modify any particular template, whose definition is maintained independent of the content description.

The present invention therefore provides a Printing Manager with a WYSIWYG Form Designer which allows users to create in a free-form manner a content description, which describes how contents (i.e., user data) are to be laid out in a form. The context description can be generically applied against various templates. Since the content description is maintained independently from the template definitions, each can be independently modified.

DETAILED DESCRIPTION OF A PREFERRED EMBODIMENT

The following description will focus on the presently preferred embodiment of the present invention, which is operative in an end-user application running under the Microsoft® Windows environment. The present invention, however, is not limited to any particular one application or any particular environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms, including Macintosh, UNIX, NextStep, and the like. Therefore, the description of the exemplary embodiments which follows is for purposes of illustration and not limitation.

System Hardware

Figure 1A:
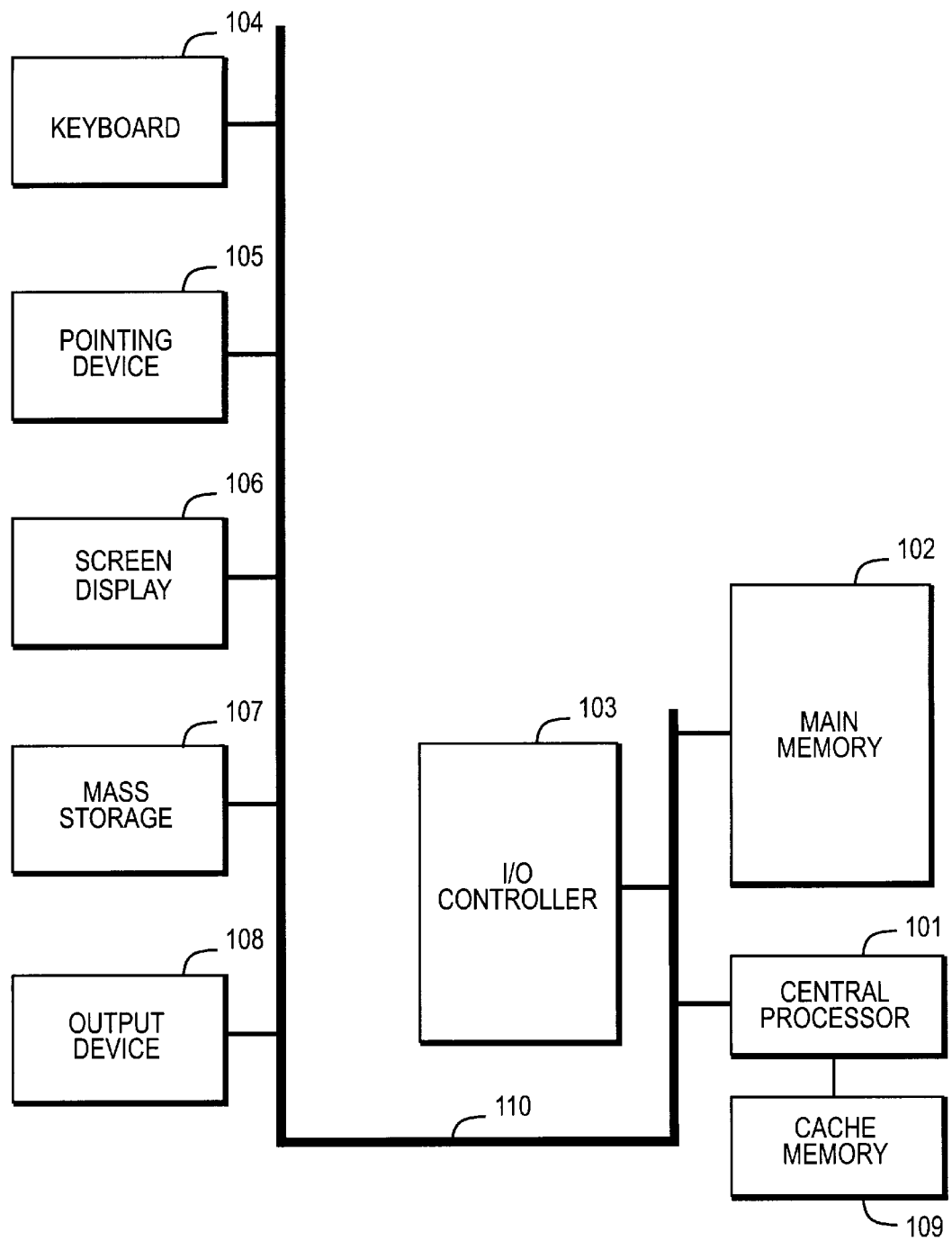
FIG. 1A is a block diagram of a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a display or screen device 106, and a mass storage 107 (e.g., hard or fixed disk, removable floppy disk, optical disk, magneto-optical disk, or flash memory). Processor 101 includes or is coupled to a cache memory 109 for storing frequently accessed information; memory 109 may be an on-chip cache or external cache (as shown). One or more input/output device(s) 108, such as a printing device or slide output device, are included in the system 100, as desired. As shown, the various components of the system 100 communicate through a system bus 110 or similar architecture. In a preferred embodiment, the system 100 includes an IBM PC-compatible personal computer, available from a variety of vendors (including IBM of Armonk, N.Y.). I/O device 108 may include a laser printer, such as an HP laserjet printer, which is available from Hewlett-Packard of Palo Alto, Calif.

System Software

A. Overview

Figure 1B:
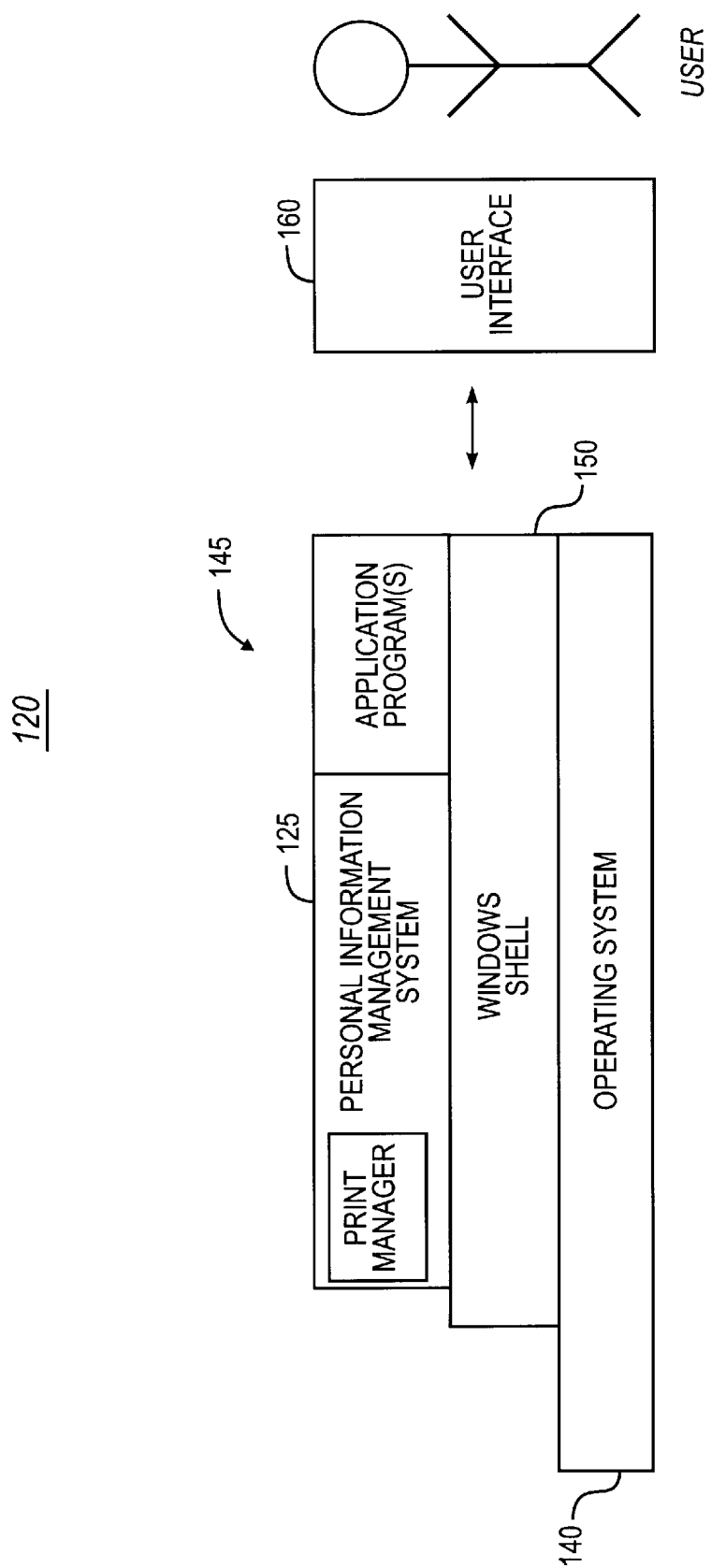
FIG. 1B is a block diagram of a software system of the present invention for controlling the operation of the system of FIG. 1A.

Illustrated in FIG. 1B, a computer software system 120 is provided for directing the operation of the computer system 100. Software system 120, which is stored in system memory 102 and on storage (e.g., disk memory) 107, includes a kernel or operating system (OS) 140 and a windows shell 150. One or more application programs, such as client application software or "programs" 145 may be "loaded" (i.e., transferred from storage 107 into memory 102) for execution by the system 100.

System 120 includes a user interface (UI) 160, preferably a Graphic User Interface (GUI), for receiving user commands and data. These inputs, in turn, may be acted upon by the system 100 in accordance with instructions from operating module 140, windows 150, and/or client application module(s) 145. The UI 160 also serves to display the results of operation from the OS 140, windows 150, and application (s) 145, whereupon the user may supply additional inputs or terminate the session. In a preferred embodiment, OS 140 is MS-DOS and windows 145 is Microsoft® Windows; both are available from Microsoft Corporation of Redmond, Wash. Although shown conceptually as a separate module, the UI is typically provided by interaction of the application modules with the windows shell, both operating under OS 140.

One application software comprises a Personal Information Management (PIM) System 125 which includes a Print Manager and interface of the present invention. In an exemplary embodiment, PIM System 125 includes Sidekick® 95, which is available from Starfish Software of Scotts Valley, Calif. A general description of the operation of Sidekicks® 95 can be found in its accompanying user manual. The Print Manager and interface of the present invention, in the exemplary embodiment of Sidekick® 95, will now be described in further detail.

Free-form Content and Layout Design for Printout to Commercial Formats

A. Basic storage of user data

In an embodiment of the invention in a Personal Information Manager (PIM), a database of information, such as an electronic "Cardfile," already exists. The Cardfile comprises a plurality of "cards." Each card, in turn, comprises a set of data concerning a certain person or thing. These data sets are inherently suitable for use in generating formatted printout, such as labels. In other words, at the outset, the data is separated into distinct data sets. From the Cardfile, the user can define a Cardfile format. Here, the format comprises selected fields from the Cardfile, with the particular fields employed may be user defined. Additionally, the user can apply a filter to select records according to particular data values stored by records. Combining filters with Cardfile formats, the user can select particular fields to be displayed from particular records.

B. Templates

Apart from the underlying storage of user data format are "templates." The templates define print layouts for particular forms, such as envelopes, address labels, and the like. In particular, the templates store layout information about how the contents are to be represented at output, including, for instance, symmetrical, "opposite corner," asymmetrical, and the like. The templates also store header and footer information, including page number and date information. The templates are described in further detail hereinbelow.

C. Free-hand Form Designer

The system provides a Form Designer which assists the user with mapping the user data (e.g., Cardfile or database data) onto a formatted output, such as a commercial form. The Form Designer is a free-hand tool—allowing the user to place fields and other information anywhere on a form (e.g., label) in a WYSIWYG ("what you see is what you get") fashion, using drag-and-drop methodology. This is perhaps best explained by demonstrating use of the Form Designer to create a simple label printout.

Figure 2:
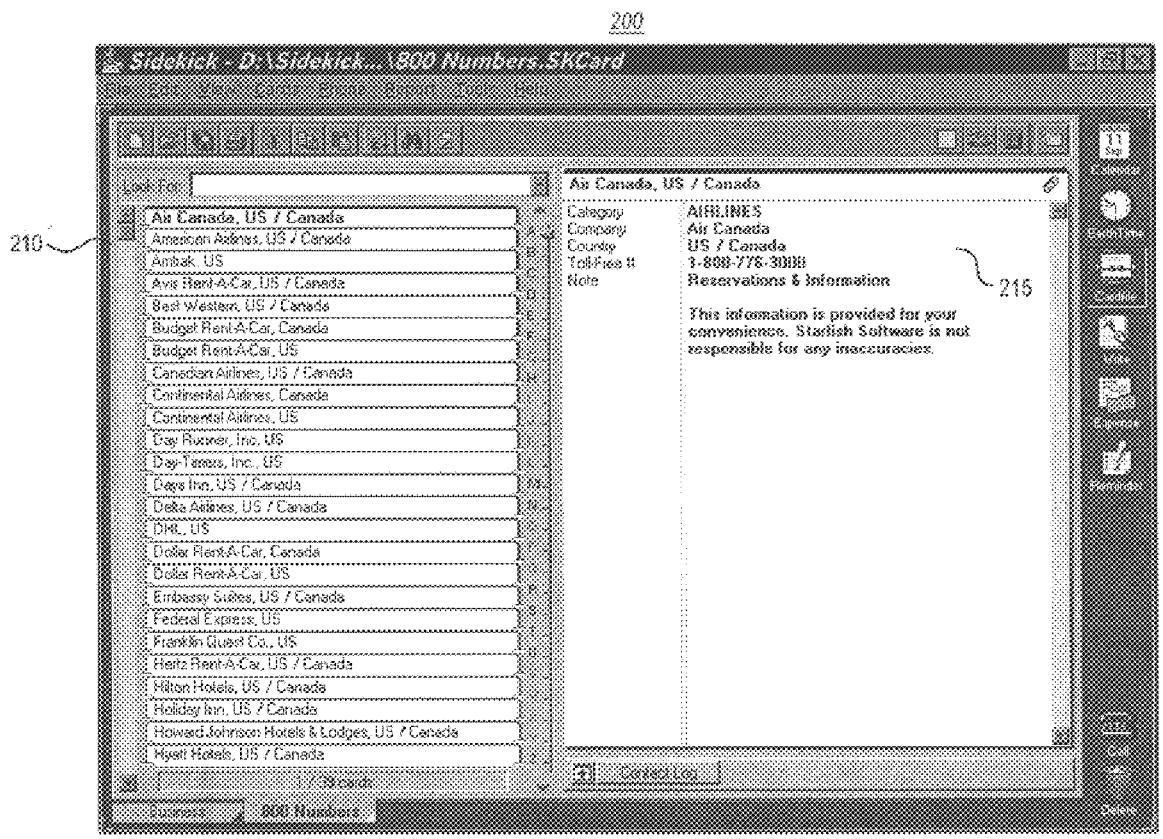
FIG. 2 is a bitmap screenshot illustrating a user interface of a Personal Information Manager in which the present invention is embodied.

FIG. 2 illustrates a user interface 200 of the Personal Information Manager of the present invention; the interface includes vertically arranged cards 210. Detail information for a currently-selected card is displayed upon selection of that card, as shown at 215. For the present example, the information shown includes common 800 numbers. Each card, being an entry or data record by itself, is the type of data which users typically desire to have a hard copy. The process of generating such a hard copy, in accordance with the present invention, will now be described.

Figure 3A:
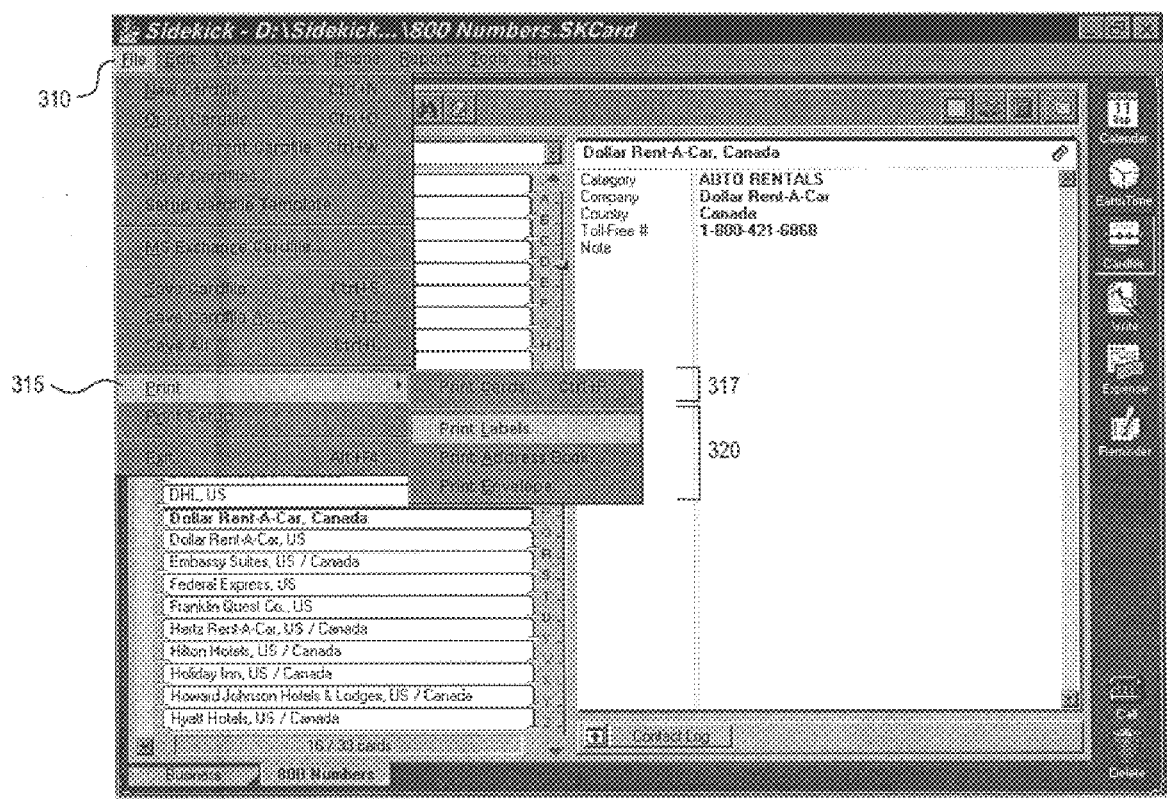
FIGS. 3A–K are bitmap screenshots illustrating user operation of the user interface of the present invention.

FIG. 3A illustrates the initial process of generating a hard copy for information from the Cardfile of FIG. 2. The user begins by selecting File 310 from the program menubar. This invokes a submenu, from which the user can select a Print option 315. This invokes an additional submenu, where the user can simply select to "Print Cards" at 317. Alternatively, the user can print the cards in a formatted fashion, by selecting "Print Labels," "Print Address Book," or "Print Envelope" at 320. For the present example, the user selects "Print Labels."

Figure 3B:
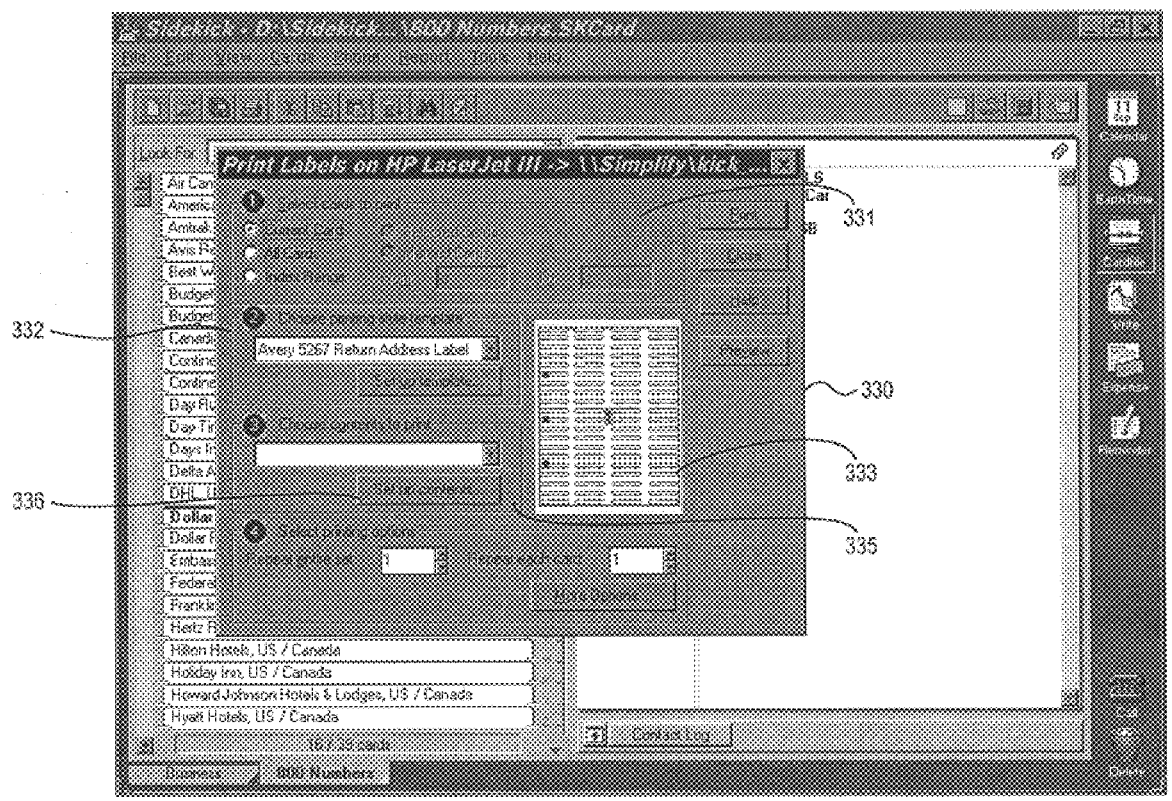

Upon the user selecting the "Print Labels" option, the system displays a Print Manager Dialog 330, shown in FIG. 3B. The Dialog 330 provides the preferred interface for the user. As shown, the Dialog includes ordered steps, separated into distinct regions, which the user follows to complete the task. The first region 331 allows the user to specify the data to be printed, such as the "Current Card," "Selected Cards," "All Cards," cards of a particular "Index Range," or the like. The second region 333 allows the user to select a particular style template (e.g., Avery 5267 Return Address Label); feedback is provided by a preview window 333. The third region 335 allows the user to specify a layout. Here, the user can choose in a free-hand manner how and where contents are to be printed.

Figure 3C:
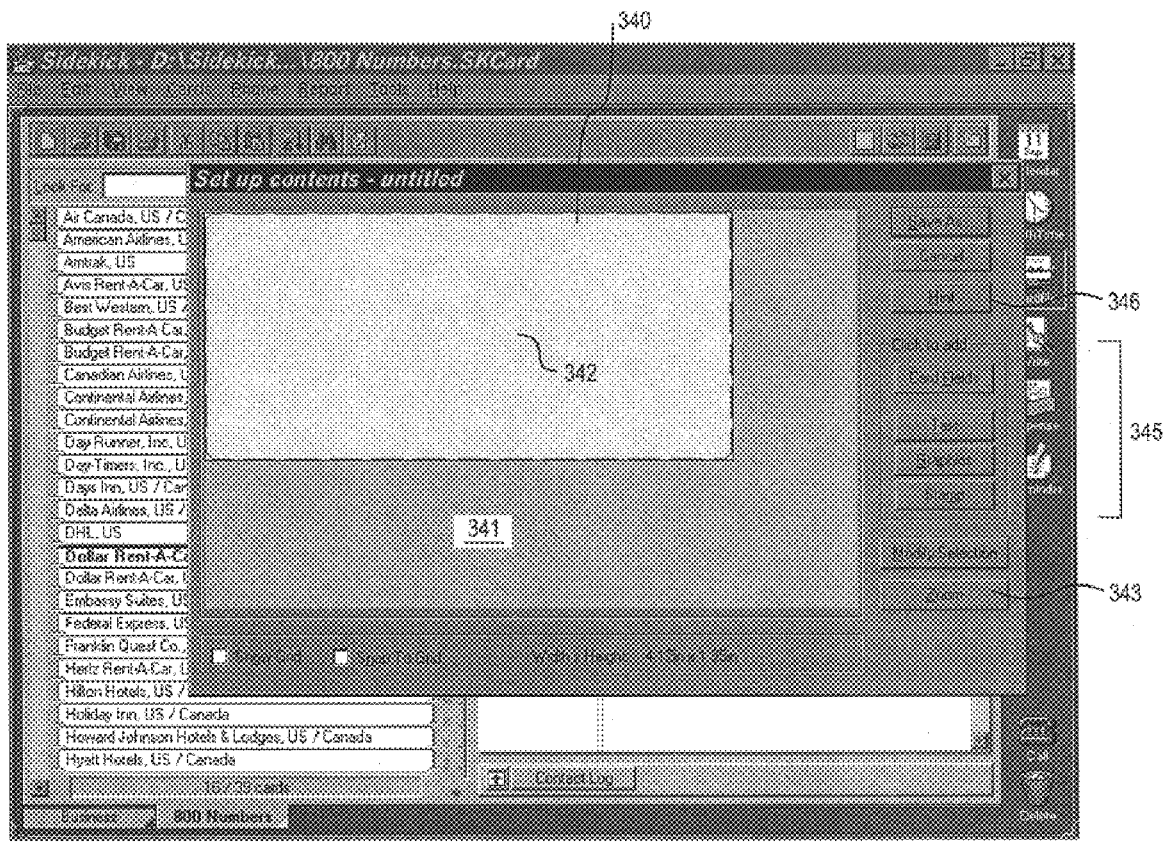

The user specifies content layout by selecting a Setup Contents Button 336. The system, in response, displays a Setup Contents Dialog 340, which is illustrated in FIG. 3C. As shown, the Dialog 340 includes a work surface 341 having an active region 342. The active region 342 indicates the current printable region for the currently selected output format (e.g., Avery 5267). The user can "zoom in" or "zoom out" of the work surface by selecting Zoom Button 343.

Starting with an empty form (as shown by the empty active region 342), the user can now proceed to add objects to the form, using Button Tools 345. As shown, the Tools 345 includes selections for adding card fields, text objects, graphics, and a stamp. If desired, the user can select Hint Button 346, for receiving instructions on how to populate the empty form with appropriate objects.

Figure 3D:
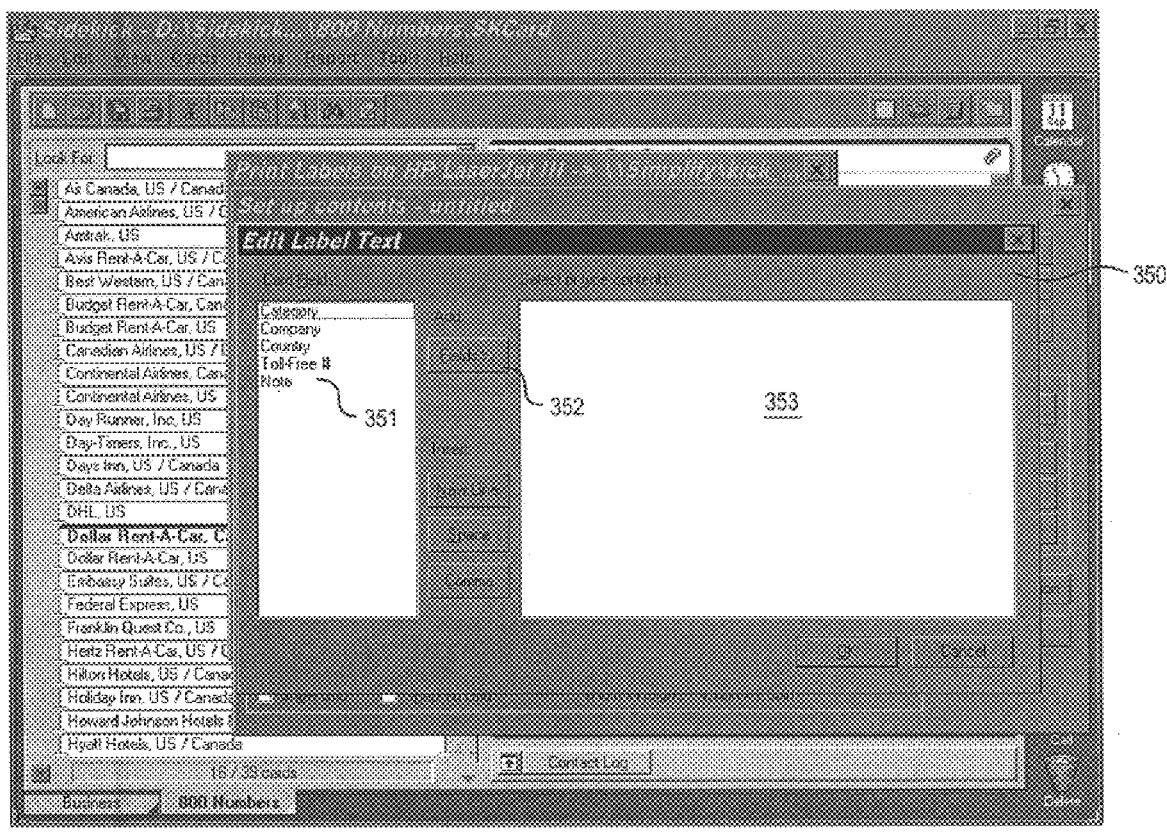
Figure 3E:
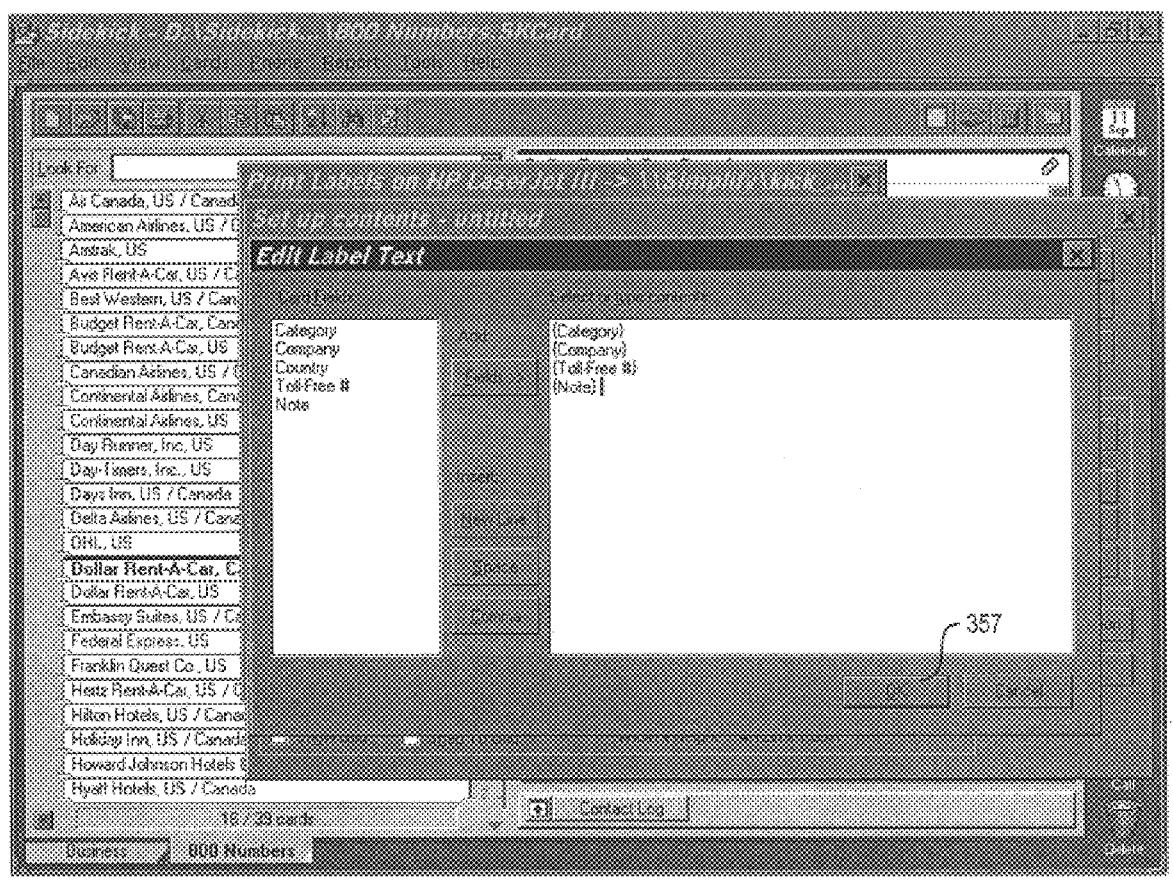

As shown in FIGS. 3D–E, upon the user selecting the Card Fields Button (of the Dialog 340 in FIG. 3C), the system displays an Edit Label Text Dialog 350, as shown in FIG. 3D. Here, the user can select fields from the database, for including them in the label to be printed. Specifically, the user selects from list 351 and clicks the Fields Button 352, to add particular fields into list 353. As shown in FIG. 3E, for instance, the user has added fields of Category, Company, Tollfree number, and Note. In this manner, the user can easily select fields to be included in the final printout. In a manner similar to that just illustrated for card field objects, the user can place the other object types (e.g., text objects, graphics, and stamps) on the form. After the user is satisfied with his or her selection, the user closes the dialog by selecting the OK Button 357.

Figure 3F:
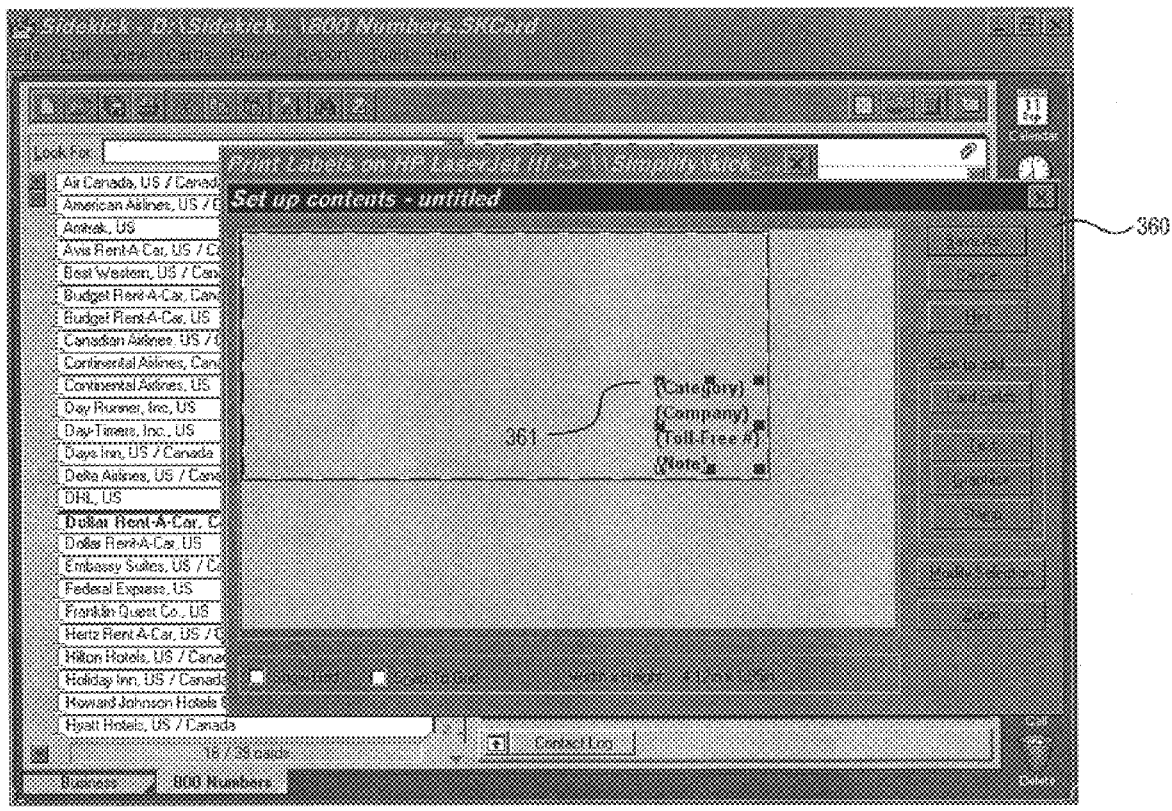

The user is now returned to the Setup Contents Dialog, shown at 360 in FIG. 3F. The dialog now includes card fields 361, which correspond to the fields selected in the dialog of FIG. 3E. Since the fields were selected together, they are treated as a single card field element 361.

Figure 3G:
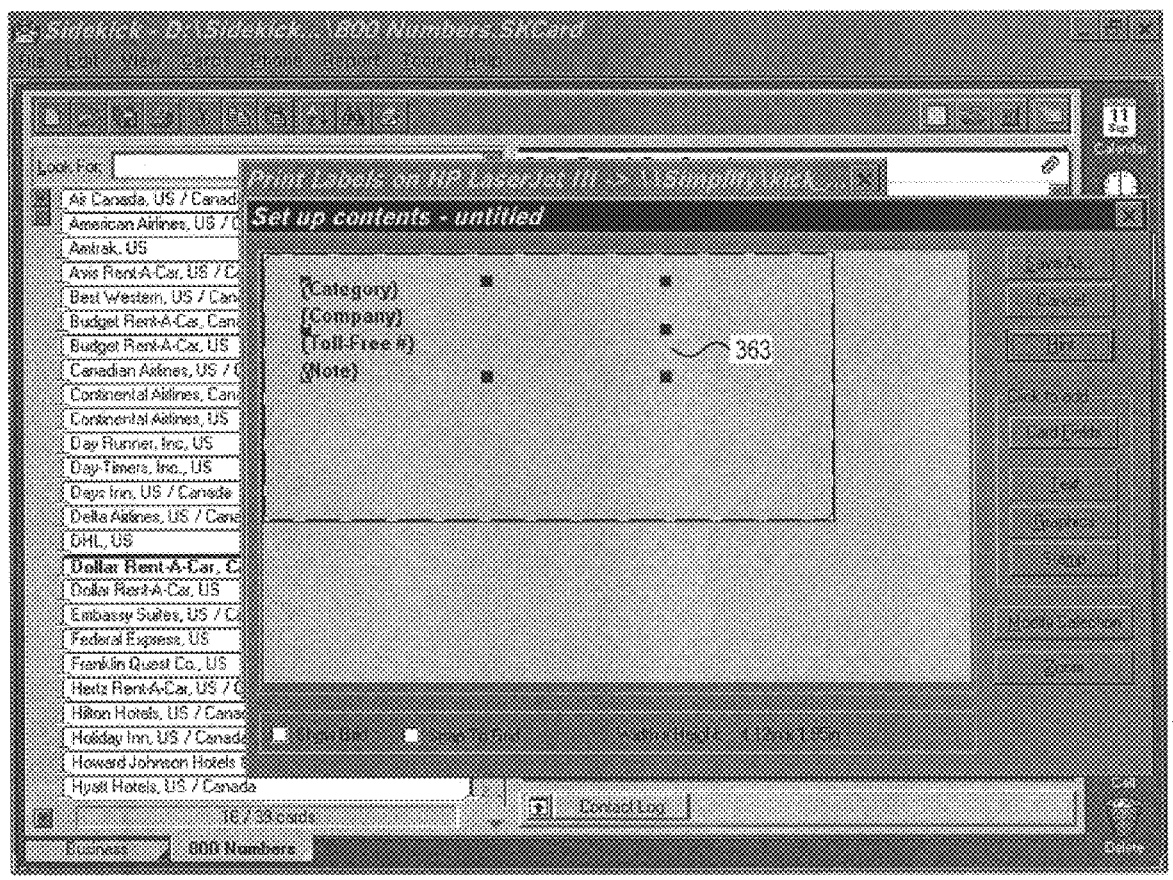
Figure 3H:
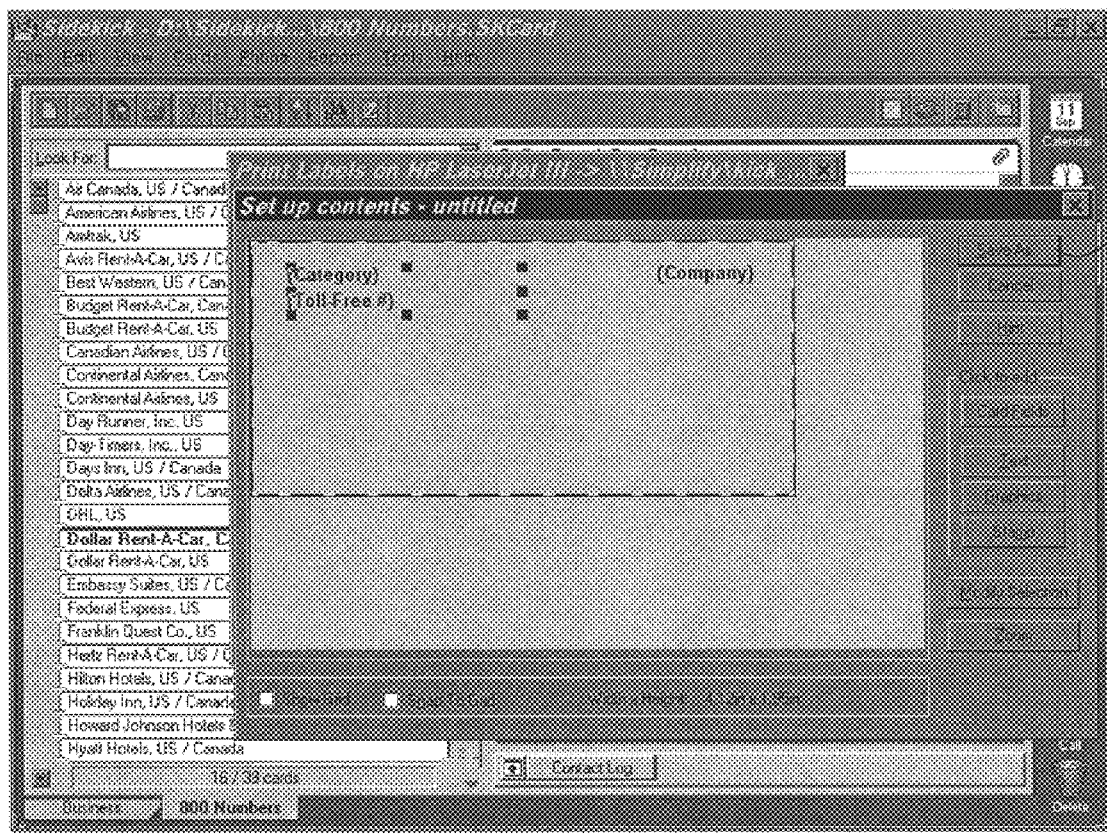

The user can treat each object graphically, including using drag and drop technique and object resizing/repositioning technique. In FIG. 3G, the user has repositioned and resized the card fields, as shown at 363. Here, the user has complete freedom to move the fields, either as a group (e.g., field group 361) or each one individually (if placed individually), to any desired position on the label. In FIG. 3H, the user has positioned an individual field (i.e., Company) on the label. Instead of grouping card fields together, for instance as done with group 361, the user has placed the Company card field as a separate object on the label.

Figure 3I:
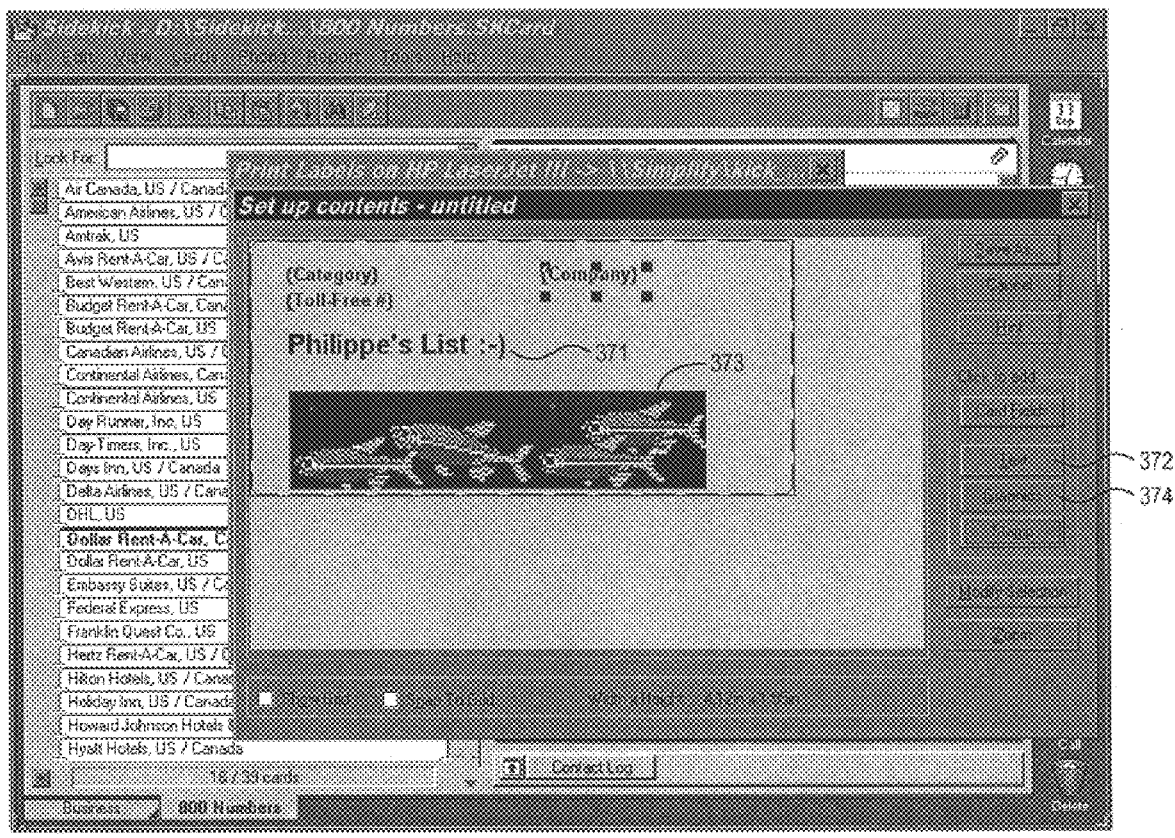

FIG. 3I illustrates placement of text and graphic objects. By selecting the Text Button 372, the user can easily place text objects on the label, such as text object 371. Similarly, by selecting Graphics Button 374, the user can place graphic objects on the label, such as graphics 373 (e.g., bitmap). The Graphics Button 374 invokes a Graphics Dialog (not shown) for specifying a particular graphics file (e.g., Windows bitmap file). In a manner similar to that shown for the Cardfiles, the user can position these new objects using drag and drop technique; similarly, the user can resize the objects as desired.

Figure 3J:
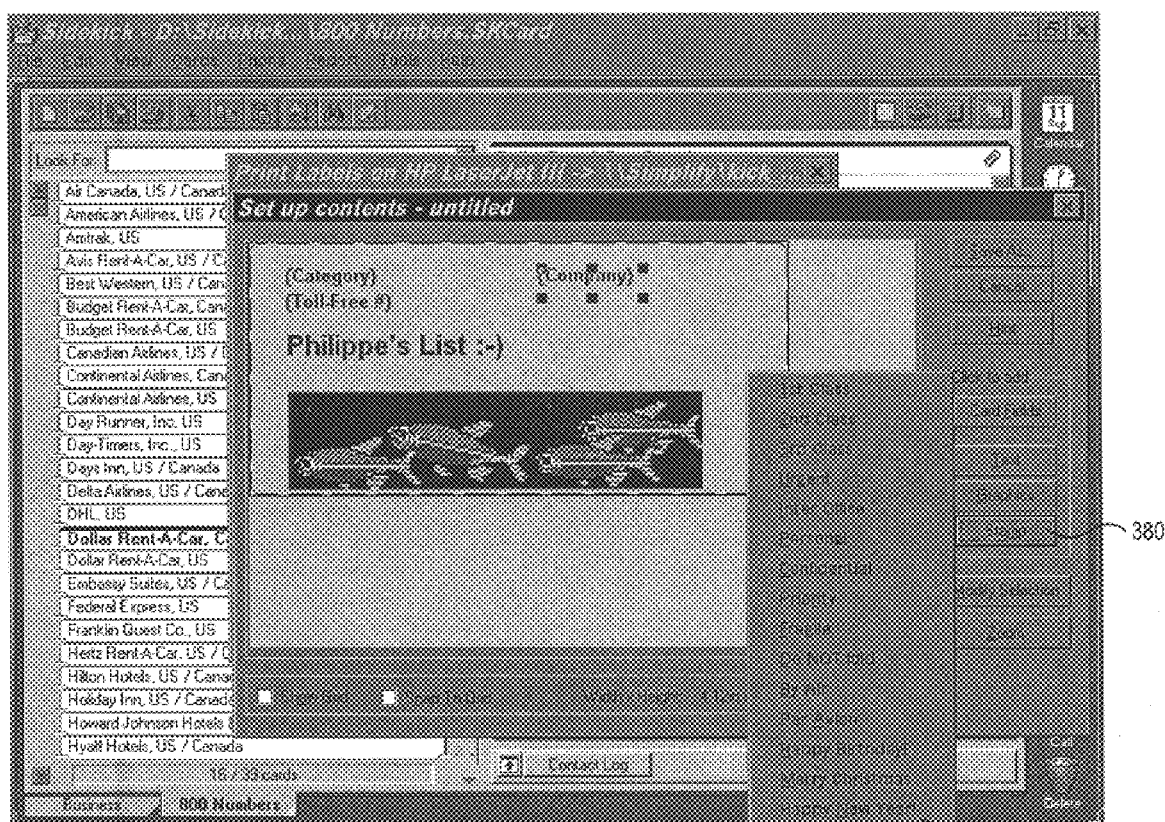

As shown in FIG. 3J, the user can select the Stamp Button 380 for placing a stamp object. In response to selecting this button, the system displays a Pop-up List 381, as shown. The list includes default stamps, such as "First Class," "Third Class," "Confidential" and the like. Stamps are typically employed when printing envelopes and, thus, will not be included in the present example (which demonstrates printing labels).

Figure 3K:
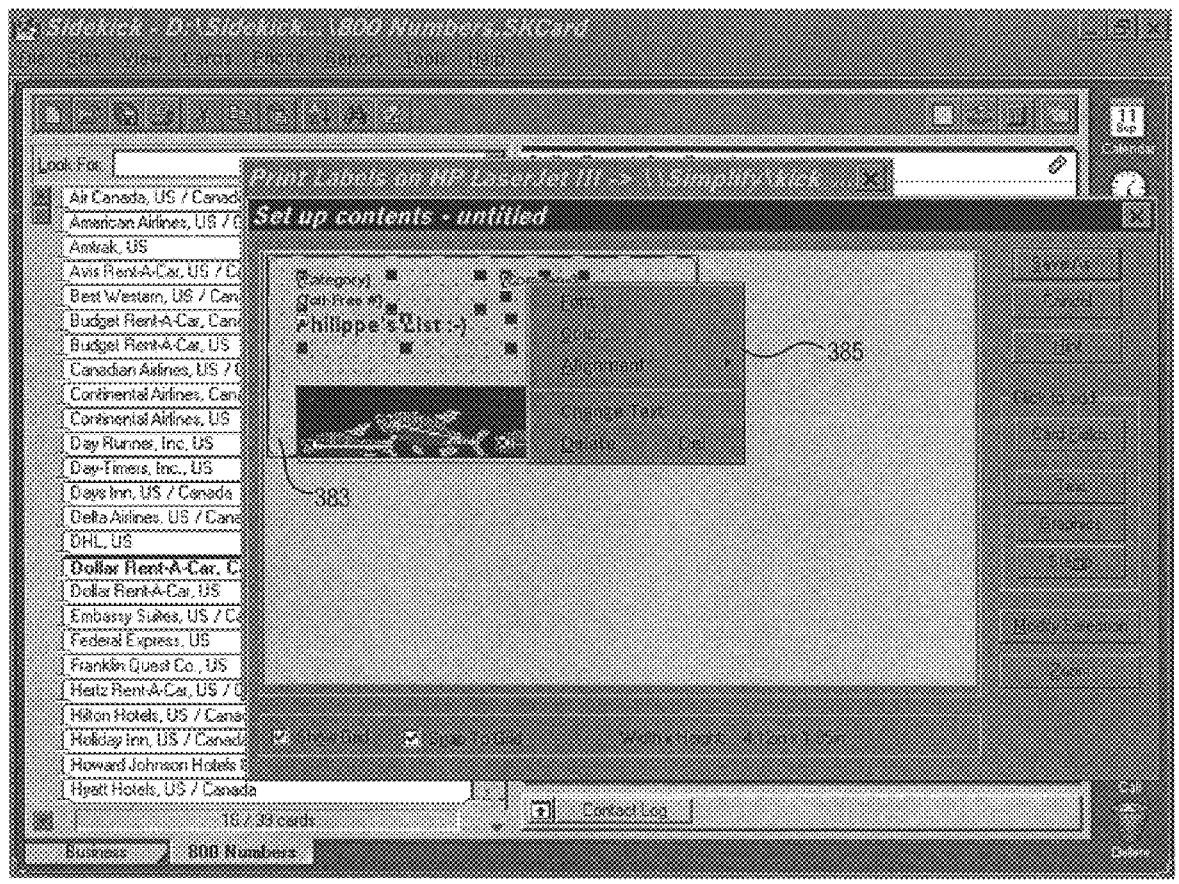

As shown in FIG. 3K, the user can employ property inspection technique for changing the properties of a selected object. For instance, the user can select a card field object by "right clicking" on it, whereupon the system displays an Inspector Menu 385, as shown in FIG. 3K. Here, the user can modify properties relevant to the object, such as font, color, alignment, and the like. Also shown, the user can activate a Grid 383 for assisting with alignment of objects on the label.

Figure 4:
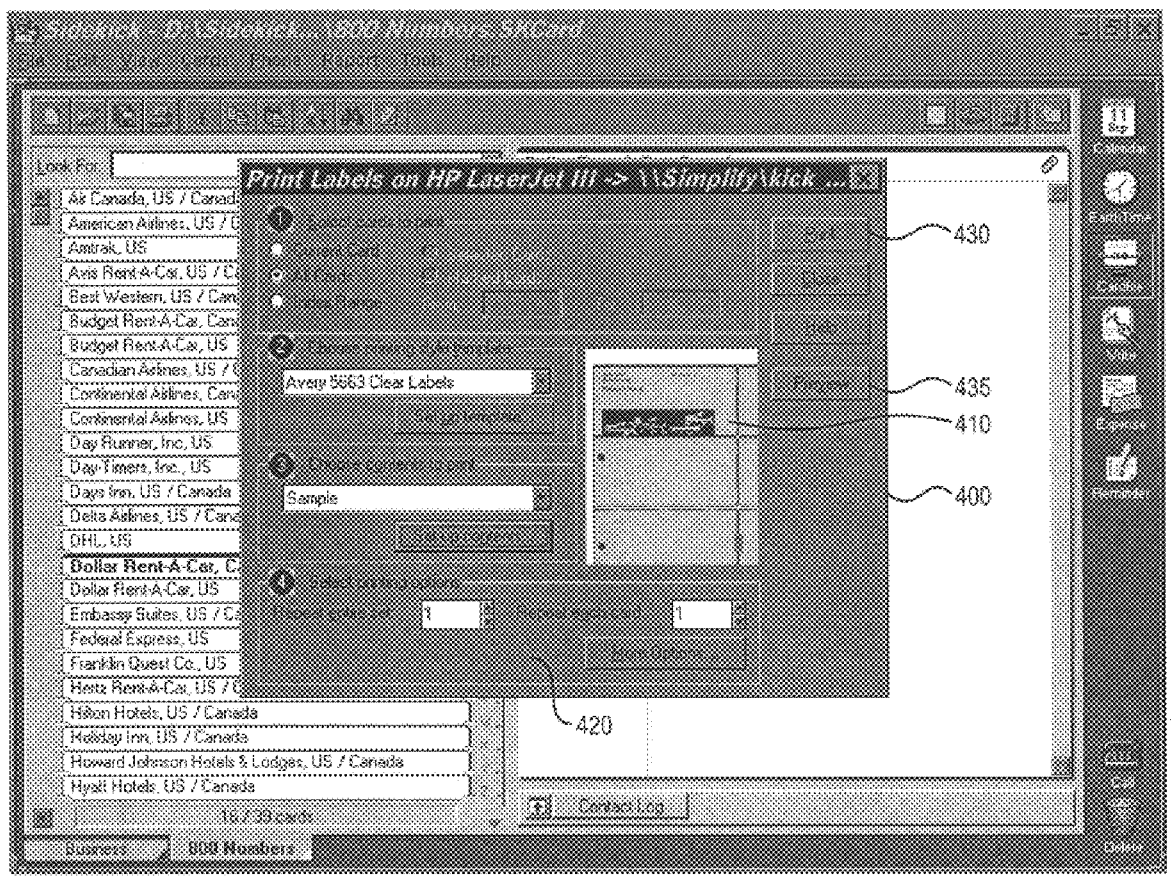
FIG. 4 is a bitmap screenshot illustrating the user interface of the present invention after user operation.

Once the user is satisfied with the arrangement of contents on the label, the user can save the content setup by selecting the "Save as" Button (e.g., Button 367 in FIG. 3H). In effect, the user is given complete freedom to "paint" the label with objects, which may then be saved as a particular description. In response to the user saving a content setup or description, the system returns the user to the Print Manager Dialog, shown not at 400 in FIG. 4. The Dialog, now changed, includes a representation 410 of the design which the user has just created. The design is shown in the context of the currently-selected template, here Avery 5663 Clear Labels.

Figure 5:
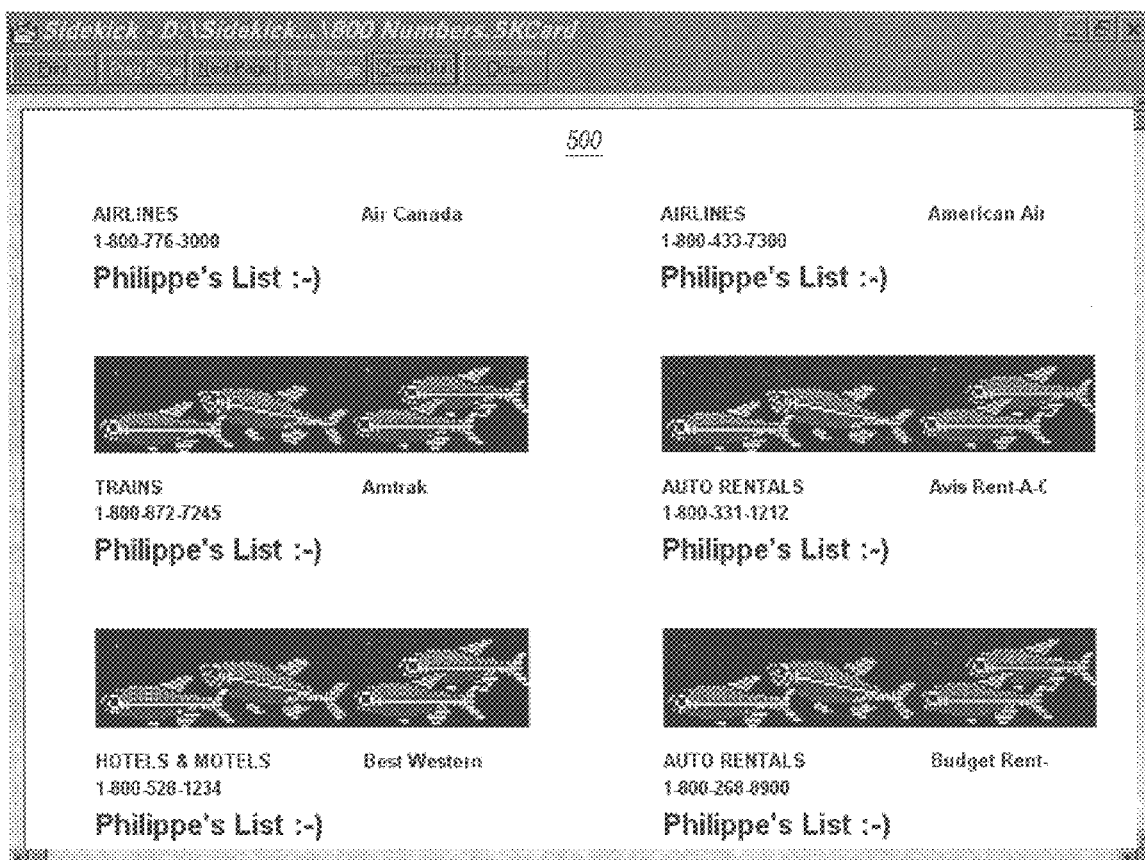
FIG. 5 is a bitmap screenshot illustrating a "preview" of formatted output, which is generated based on user input.

The user can proceed to complete the dialog by completing the fourth region, shown at 420. Here, the user simply specifies printing options, such as the number of times each individual card is repeated, or the number of times each set of cards is repeated. After completing this information, the user has supplied all information necessary for the print job. The user may now proceed to instruct the system to print the labels, by selecting the Print Button 430. Alternatively, the user can choose to first "preview" the printout, by selecting Preview Button 435. A preview view 500 is shown in FIG. 5. The preview view shows the actual card contents applied to the layout. In the card fields, for instance, the field name placeholder is replaced with the actual contents from the underlying data file.

Figure 6A:
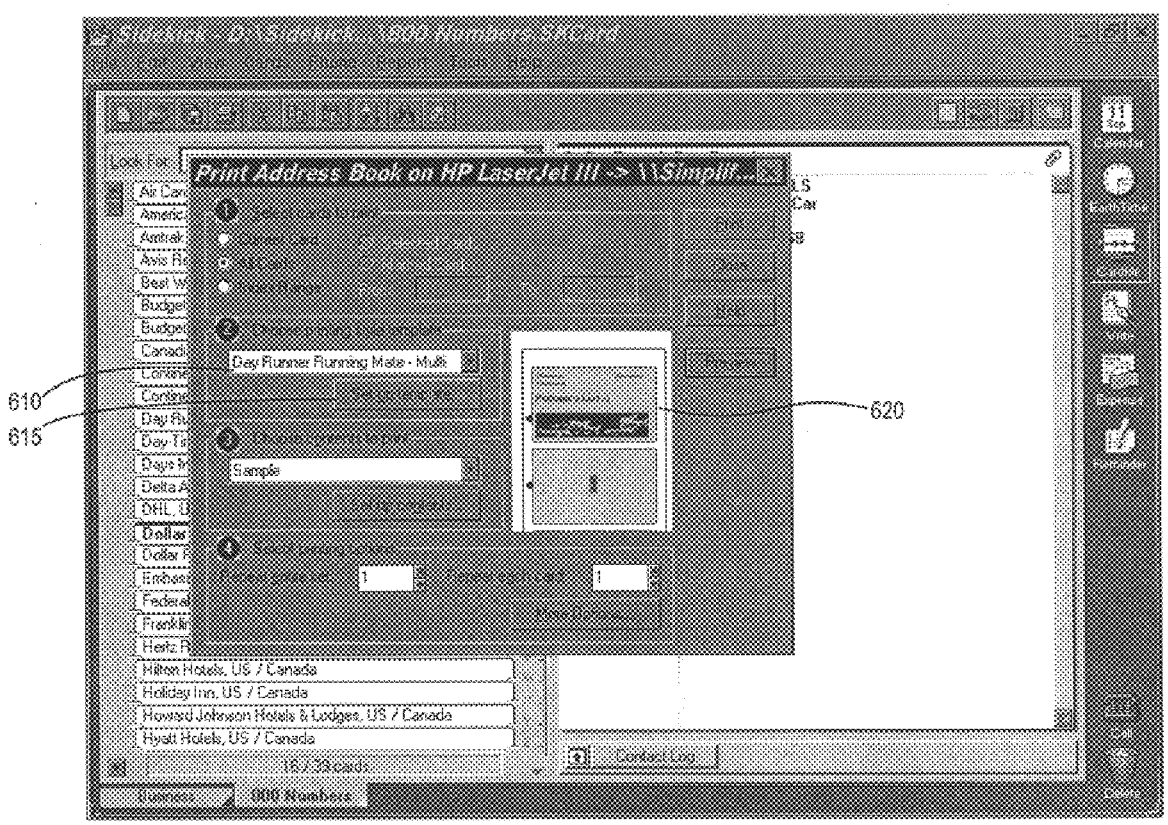
FIGS. 6A–C are bitmap screenshots illustrating user operation of the user interface of the present invention for selecting different form templates.

As illustrated in FIG. 6A, the content description just created by the user can be applied against various templates in a generic fashion. In FIG. 6A, the user has selected a different style template at 610, the Dayrunner™ Running Mate template. Preview 620 is updated, accordingly. The user can cycle through various templates, with the content description being automatically applied against each template.

Figure 6B:
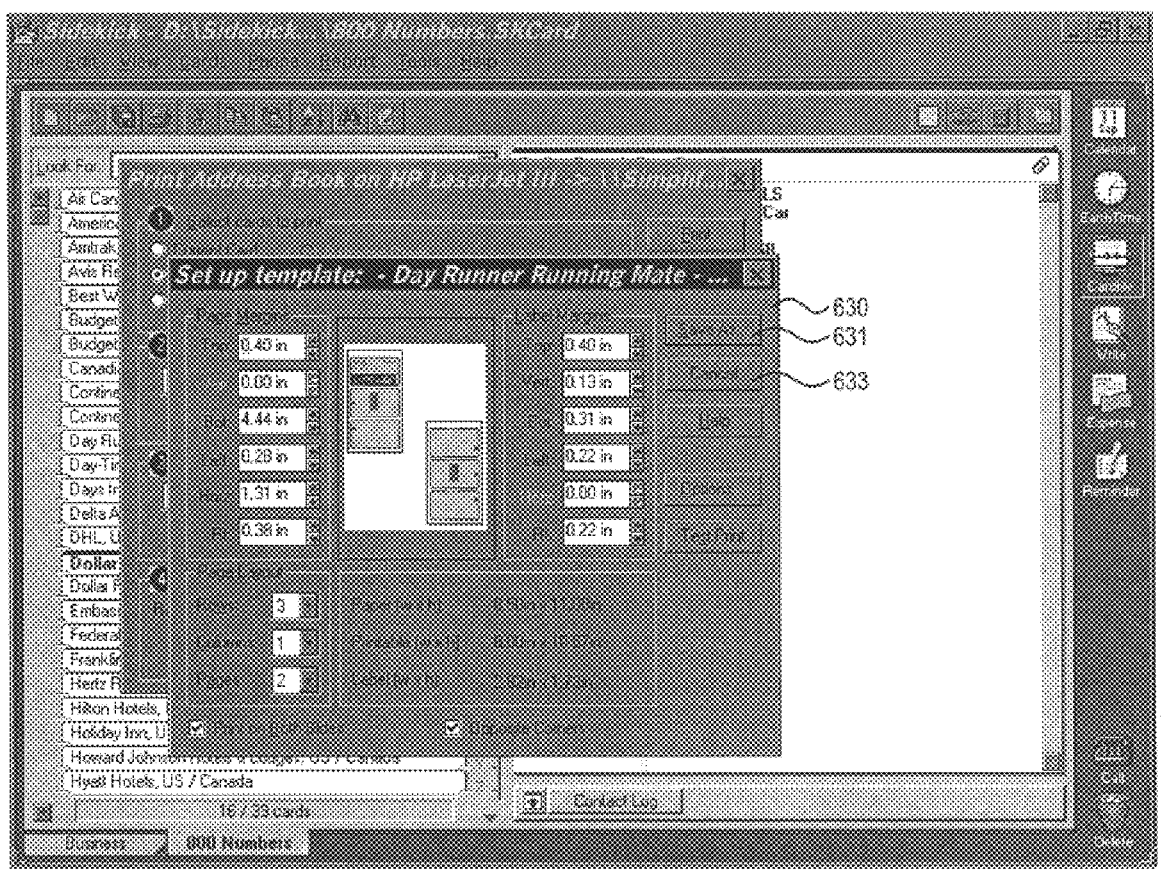

As shown in FIG. 6B, the user can modify the template definition itself, which is maintained independent of the context description. Upon the user selecting the Setup Template Button 615 (shown in FIG. 6A), the system displays Setup Template Dialog 630. Here, the user can adjust the template definition, such as setting page margins, label margins, page layout, and the like. Also, the user can modify whether the definition specifies that the label prints on both sides and/or opposite corners. The dialog is closed by selecting the Save as Button 631, for saving the template definition under a particular name. Alternatively, the user can simply cancel the dialog by selecting Cancel Button 633.

Figure 6C:
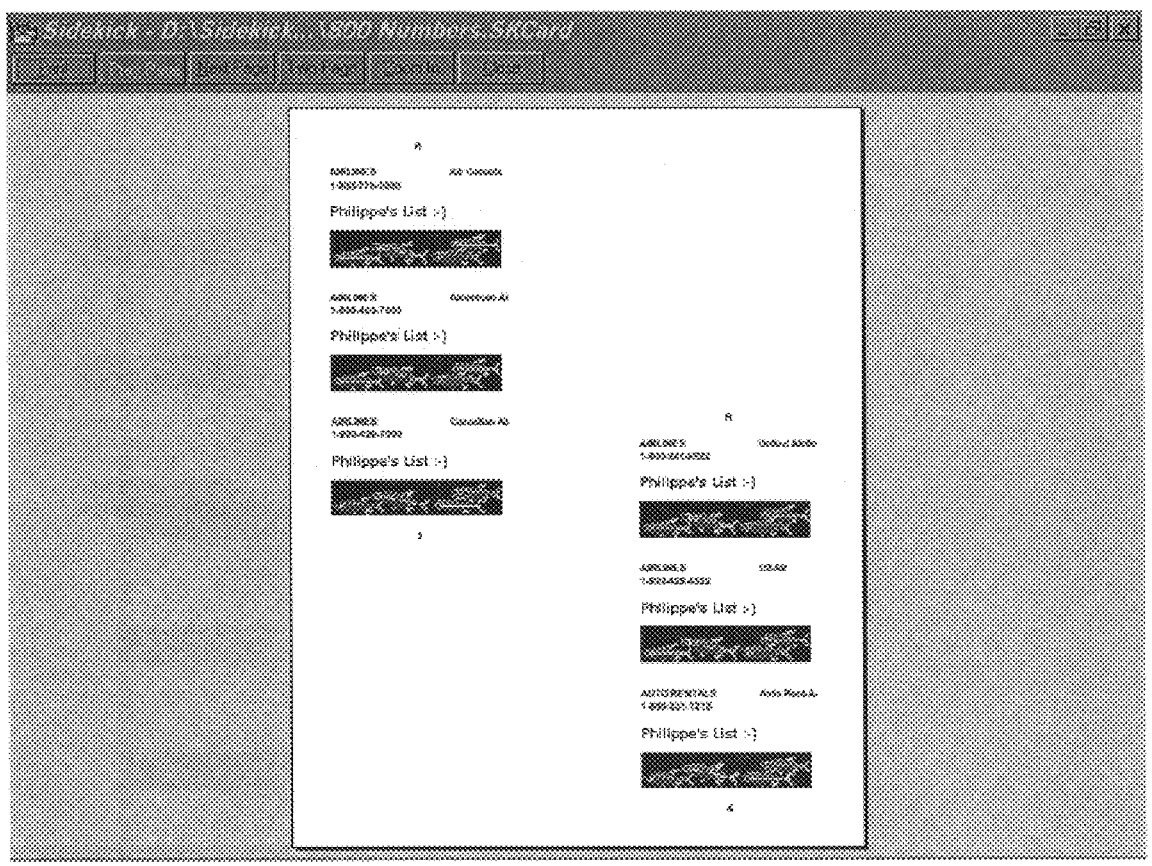

FIG. 6C illustrates, in preview mode, printout of the contents with the newly selected template, here Day Runner Running Mate. Thus as just illustrated, the system of the present invention provides a WYSIWYG Form Designer which allows users to create in a free-form manner a content description, which describes how contents (i.e., user data) are to be laid out in a form. The context description is maintained independently from the template definitions and, thus, can be generically applied against various templates.

Internal Operation

A. Modules

Figure 7:
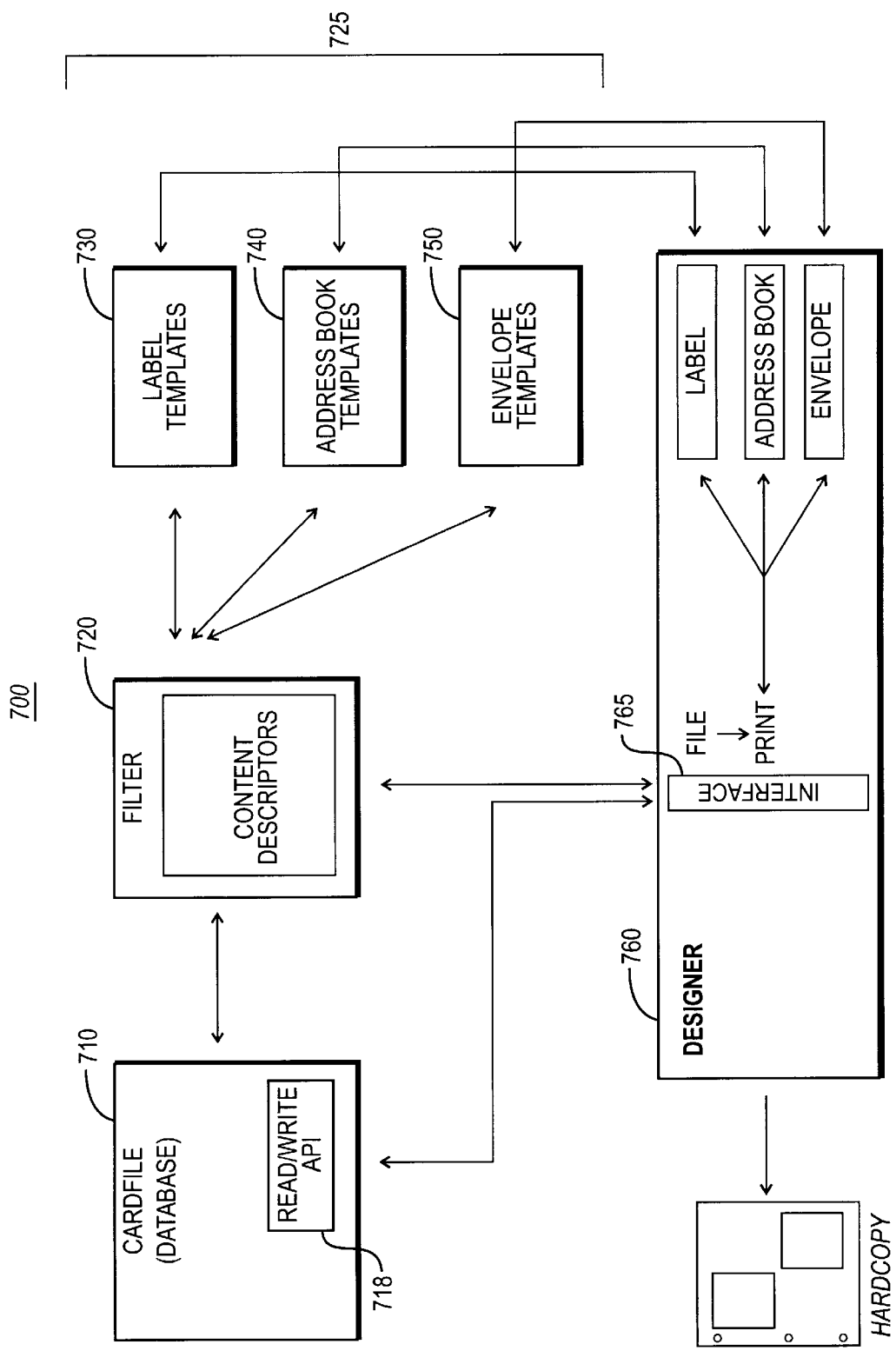
FIG. 7 is a block diagram of a Printing System ("Print Manager") of the present invention.

As shown in FIG. 7, a Printing system ("Print Manager") 700 of the present invention includes a Cardfile Module (database) 710, a Filter Module (Content Descriptors) 720, Templates 725, and Designer Module 760. Each module will be described in further detail.

The Cardfile module 710 includes a read/write API (Application Programming Interface) 718 for storing and maintaining data files (e.g., electronic Cardfile). API 718 surfaces particular function calls to the Designer 760, thereby allowing the Designer to read from and write to the Cardfile. For generating the printout, the information from the Cardfile module 710 is "filtered" through the Filter Module 720. The Filter Module 720 stores "content descriptors" about the information in the Cardfile fields. For example, the Filter Module 720 stores particular field names from the Cardfile, together with the arrangement of the field which is specified by the user during content setup. The content descriptors in the Filter Module 720 do not store actual content (i.e., user data) from the Cardfile. Nevertheless, information from the Cardfile will ultimately be realized as a hard copy, after appropriate filtering by the Filter Module 720. Arrangement on the hard copy is specified by the Templates 725, which, in a preferred embodiment, include Label Templates 730, Address Book Templates 740, and Envelope Templates 750.

B. General operation

In operation, the Cardfile Module 710 provides raw data to the Designer Module 760. Through the read/write API 718, various fields which comprise the Cardfile can be discerned. The Designer 760 can, therefore, provide an interface 765 to the user which includes fields (i.e., card field objects) which the user selects from the Cardfile. Based on the user's selections, appropriate content descriptors are stored by the Filter Module 720. As previously illustrated, these selections are received by the Designer 760 through print dialogs which comprise the interface 765. The interface allows the user to select a Cardfile (file) and then print that file either as a label, address book, or envelope. Each of these choices in the interface correspond to respective templates 730, 740, 750.

C. Data structures

Before describing methods of the present invention, it is first helpful to examine the data structures employed by those methods. A first data structure, LBPRINT, is employed for storing selections specified by the user. In an exemplary embodiment, the data structure may be created as follows (using the C programming language).

```
// all printing
typedef struct
{
    int     Totalcards ;
    BYTE    CardSelect ;
    short   KeyField ;
    BYTE    flag ;
    BYTE    ifLandscapeOK ;
    BYTE    ifLandscape ;
    WORD    ifManualFeedOK ;
    WORD    ifManualFeed ;
    BYTE    nCopies ;
    BYTE    CardCopies ;
    char    index1 [MAXSEARCH+4], index2 [MAXSEARCH+4];
    BYTE    ifDelLine ;
    BYTE    ifDelCard ;
    double  top, left ;
    BYTE    envFeed ;
    BYTE    ifPageNum ;
    BYTE    ifIndex ;
    BYTE    ifSingleIndex ;
    BYTE    rowStart, colStart ;
} LBPRINT;
```

As shown, the data structure stores general printing options the user is able to choose. Each functions as follows.

| General options: | |
|---|---|
| TotalCards: | number of cards to be printed; |
| CardSelect: | card range; |
| KeyField: | printing order; |
| flag: | label-address-envelope flag; |
| IfLandscapeOK: | if support landscape flag; |
| ifLandscape: | if landscape flag; |
| ifManualFeedOK: | if printer support manual feed flag; |
| ifManualFeed: | if manual feed flag; |
| nCopies: | number of clpies; |
| CardCopies: | card copies; |
| index1[ ]: | card index range (1); |
| index2[ ]: | card index range (2); |
| ifDelLine: | del blank line flag; |
| ifDelCard: | del blank card flag; |
| Envelope printing options: | |
| top, left: | envelope margins; |
| envFeed: | envelope feeding flag; |
| Address-label options: | |
| ifPageNum: | page number flag; |
| ifIndex: | index flag; |
| IfSingleIndex: | single index tab per page; |
| rowStart, colStart: | starting row and column |

The LBPRINT data structure, in effect, serves as a session descriptor, for a particular printing session.

Next, a "template" data structure is employed to define various templates. In an exemplary embodiment, both address and label templates are formed from an identical template data structure, LBTEMPLATE. The template data structure can be constructed as follows (in the C programming language).

```
// Label-Address Template
typedef struct
{
    char      name [FORMNAMELEN+4];
    // locations
    double    top, bottom, left, right, vert, horz;
    // margins
    double    fmtop, fmbot, fmleft, fmrite, fmvert, fmhorz;
    short     row ;
    short     column;
    short     page;
    BYTE      ifOpposite;
    BYTE      ifBothSides;
    BYTE      ifLRMirror;
    BYTE      ifTBToggie;
    BYTE      ifRevOrder;
    BYTE      ifBindHole;
} LBTEMPLATE ;
```

The data structure stores information defining a template. The particular data members of the data structure function as follows.

| name[ ]: | internal name for identifing a particular template record; |
|---|---|
| top, bottom, left, right, vert, horz: | locations; |
| fmtop, fmbot, fmleft, fmrite, fmvert, fmhorz: | margins; |
| row: | row; |
| column: | column; |
| page: | page type (1, 2, 2v, 3, 3v, 4: whole, half, quarter, 3 stripes, binding hole (same side), 2 way/3 way vertical split; |
| ifOpposite: | ifopposite flag (put the second page on opposite corner); |
| ifBothSides: | ifboth sides (print) flag; |
| ifLRMirror: | mirror left/right on reverse side flag; |
| ifTBToggie: | toggle top/bottom on reverse side flag; |
| ifRevOrder: | re-page-numbering on reverse side flag; |
| ifBindHole: | binding hole layout. |

The data structure, which defines a single template record, essentially stores two sets of margins. A first set of margins, the label margins, include: top, bottom, left, right, vert, and horz. These form a set of inner margins. A second set of margins, the page margins, are defined in a corresponding manner for the form: fmtop, fmbot, fmleft, fmright, fmvert, and fmhorz. Use of these two sets of margins is perhaps best illustrated diagrammatically.

Figure 8:
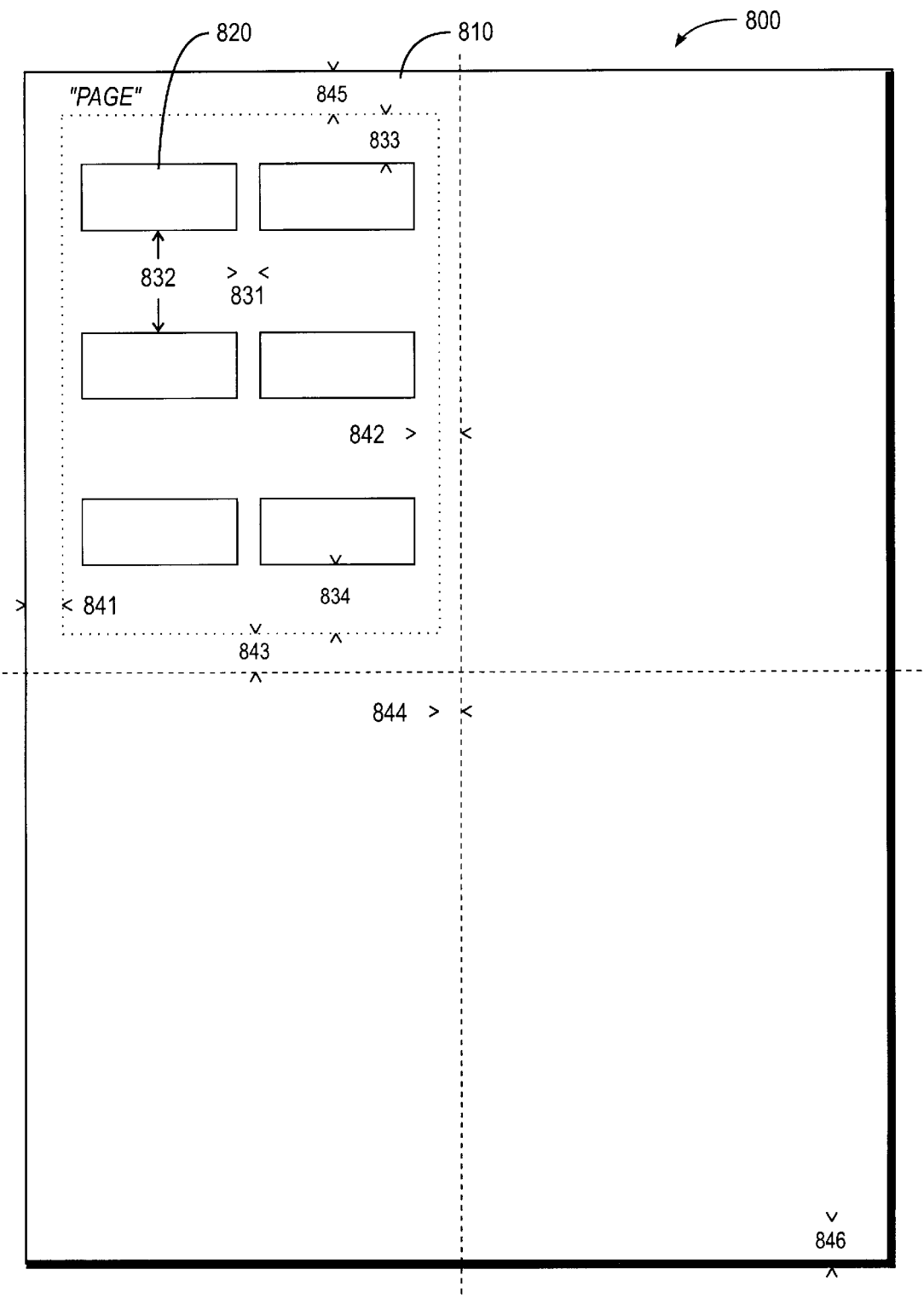
FIG. 8 is a diagram illustrating use of "inner" and "outer" sets of margins.

FIG. 8 illustrates the "inner" and "outer" sets of margins. As shown in FIG. 8, "paper" 800 can be divided into frames or "pages," such as page 810 for a paper divided into four equal sections. Here, paper 800 represents the actual physical paper. The paper can be divided into other frames, such as three horizontal or vertical sections, or two horizontal or vertical sections.

Within each page (e.g., page 810), there exists a plurality of label areas, such as area 820. Between the label areas are the inner set of margins. As shown, for instance, page 810 includes the following margins: horz 831, vert 832, top 833, and bot 834. The paper includes the following outer set of margins: fmleft 841, fmright 842, fmvert 843, fmhorz 844, fmtop 845, and fmbot 846. Here, the outer set of margins define the margins for the particular page or frame, which the paper has been divided into. The use of separate sets of margins is particularly advantageous in a "page flip" layout, such as previously illustrated. In particular, such an approach simplifies determination of layout for the flip or reverse side.

Figure 9:
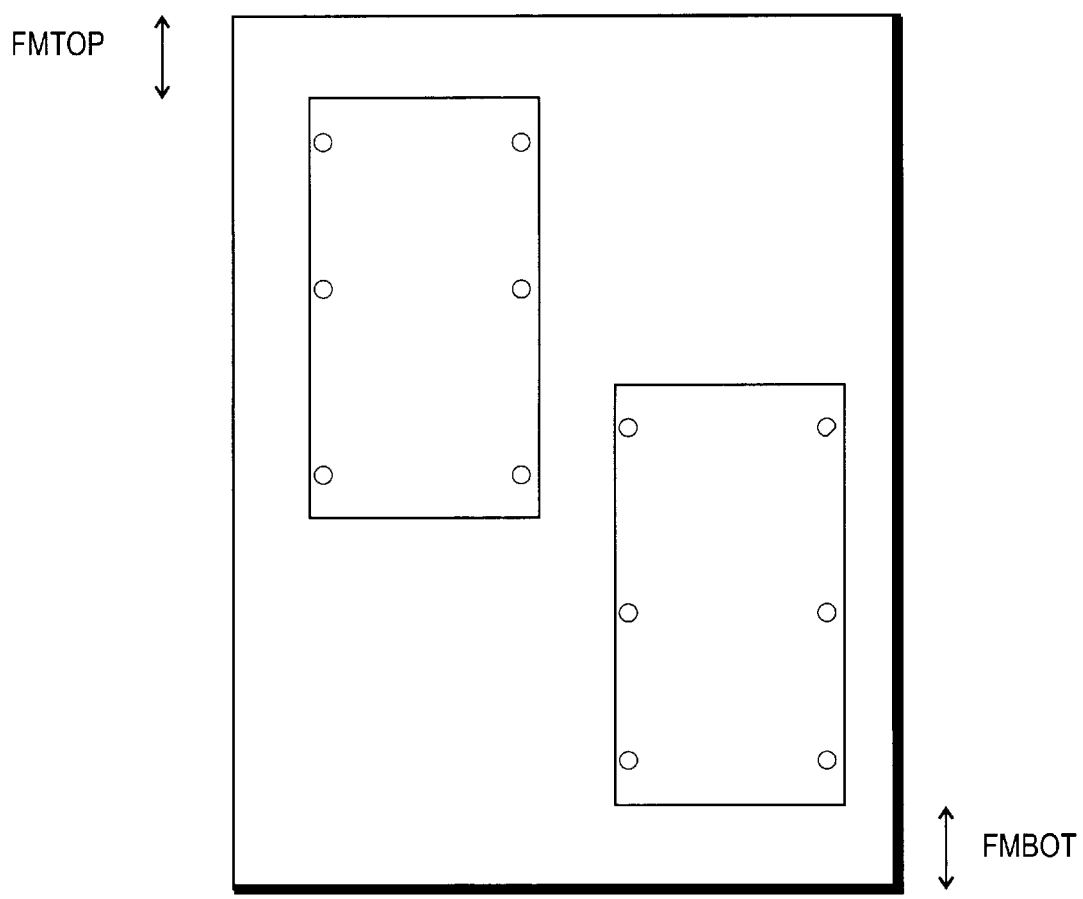
FIG. 9 is a diagram illustrating a two way split printout with opposite corners.

The row and column data members of LBTEAPLATE indicate the number of rows and columns of labels. In FIG. 8, for instance, page 810 includes three rows and two columns of labels. The remaining data members of the data structure serve as flags or booleans. The ifOpposite member is a flag indicating "opposite corners" for a two way split. An example of a two way split with opposite corners is illustrated in FIG. 9. Note, here, that the top frame margin must match the bottom frame margin. The ifBothSides member is a flag indicating that both sides of the paper are employed for printout. In other words, this specifies that the printout is "double sided," and thus affects how pages are sent to the printer. This is supported in different ways by various printing devices, including automatically (i.e., duplex printing) and manually (i.e., the user must manually re-feed the pages). The ifLRMirror and ifTBToggle data members function similarly to the "opposite corners" data member. Here, however, the data members specify that the entire set of margins (not just top and bottom) are employed when flipping over a page. The last two data members are ifRevOrder and ifBindHole. The former serves as a flag which indicates that the page numbering should be reversed (i.e., printed in reverse order). The latter indicates what type of binding holes, if any, is employed for the form. The enumerated types include "same side" and "opposite side." The binding hole type also affects the page order on final printout.

Each object which exists on a form is a "form cell." Each cell, in turn, is described by a FORMCELL record—a descriptor for the object. During system operation, the descriptor is employed as a "filter object," for filtering the Cardfile data into a final printout. In an exemplary embodiment, the FORMCELL data structure may be constructed as follows.

```
// Formcell - - functions as Filter/Envelope Object
typedef struct {              // each cell (rect) on the envelope
        long            type
        char            FieldIndex [MAXCELLFIELDS+4] ;
        char            buf[BUFSIZE+4] ;
        long            scale ;
        long            left, top, right, bottom ;
        FFONT font ;
} FORMCELL;
```

The data structure stores information defining a template. The particular data members of the data structure function as follows.

```
type            TYPE_TEXT - generic text,
                TYPE_GRAPH - stretched bitmaps,
                TYPE_LABEL - text with card fields in it,
                TYPE_STAMP - rotatable text,
                TYPE_FRAME - rectangle frame,
                TYPE_VLINE - vertical line,
                TYPE_HLINE - horizontal line,
                TYPE_OLEOBJ - OLE (Microsoft OLE 2.x) object;
FieldIndex [ ]: indices of the card fields in buf(TYPE_LABEL only);
buf[ ]:         1. filename of TYPE_GRAPH,
                2. text of TYPE_TEXT, TYPE_STAMP,
                TYPE_LABEL, TYPE_OLEOBJ;
scale:          1. bitmap scale factor of TYPE_GRAPH,
                2. TotalIndice of Fields of TYPE_LABEL,
                3. Line size of
                TYPE_FRAME/TYPE_VLINE/_HLINE;
left, top, right, bottom: define a rectangle in 2D space;
font:           FFONT (font) structure.
```

As shown, type is the first data member. It stores the type of cell, such as graph, label, text, stamp, and the like. The next data member, FieldIndex serves as an index of card fields in memory (in a buffer); this is employed for cells of type "label" (i.e., those with text from card fields). For label fields, the field name for the field will be replaced with the actual contents for that field (from the underlying Cardfile). The buf data member is a buffer which stores either: (1) the file name of type "graph," or (2) the text of type "label" (text, stamp, or OLE object). The scale data member stores the scale factor for the field, (e.g., such as a scale factor for a bitmap of type "graph"). For cells of type "label," the scale data member stores the total indices of fields. Otherwise, for cell type of "frame," "vertical line," or "horizontal line," the scale data member stores the line size. Size and position of the cell is characterized by a rectangle defined by the left, top, right, and bottom data members. Collectively, these define a particular rectangle. Finally, the font data member stores a value indicating a particular font employed for the cell object.

D. Methods

1. General

Figure 10:
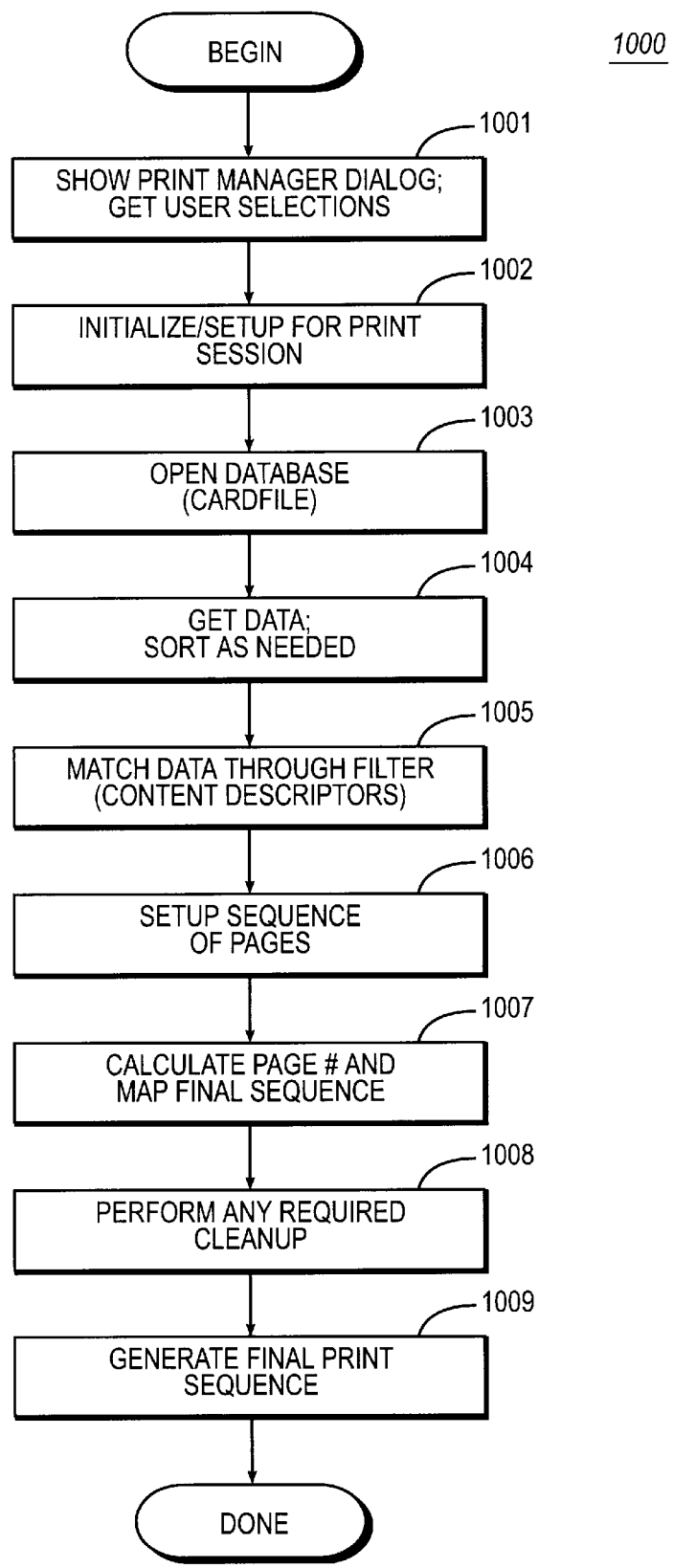
FIG. 10 is a flowchart illustrating general steps for an overall printing method of the present invention, for directing operation of the Print Manager (of FIG. 7).

As displayed in FIG. 10, an overall printing method 1000 of the present invention, for directing operation of the Print Manager, can be divided into the following general steps. At step 1001, the system displays the Print Manager Dialog, for getting information from the user about what is to be printed and how it is to be laid out. The method then initiates a print session (e.g., initialize globals) at step 1002. The method proceeds to step 1003 to open the database (e.g., Cardfile). Then, at step 1004, the data is retrieved from the database and sorted, as required by the user. At step 1005, the system matches the data through the filters, using the previously-described content descriptors.

After the data matching step, the method still has to figure out how the data are to be laid out on page. Thus, at this point, the method sets up a page sequence, at step 1006. Each page includes one or more cards. For instance, the first page might include cards 1–5, while the second page includes cards 6–10. At step 1007, the method calculates page numbers, as required by the user input. In the template, how a page is split (e.g., two vertical split, three vertical split, opposite corner, and the like) is specified. This information, in turn, dictates how the page number is finally laid out and is employed for mapping a final print sequence.

Finally, at step 1008, the method can initiate the print sequence for the environment. In Microsoft Windows, for instance, this would include appropriate calls to Windows' GDI (Graphic Device Independent) interface for invoking Windows print routines/drivers.

2. Specific methods

The high-level method just described will be examined in further detail by describing particular subroutines or methods of the present invention which are invoked. The high-level method invokes a SortPrintCards method. Although the method sorts a selected printing card range, as needed, the method also serves as a jumping off point to other subroutines. In an exemplary embodiment, the method can be constructed as follows.

```
1:  /************************************************************
2:  1. resort the selected printing card range (if needed)
3:  2. setup the print label page card indices
4:  ************************************************************/
5:  int     SortPrintCards (HFILE fh_old, HFILE fh_tmp)
6:  {
7:  LPCARDHEADER    lpCardHd;
8:  HANDLE          hdBuf, hCardText, hdCardSelection ;
9:  LPSTR           lpCardText;
10: int i, res = IDOK, icard, iStartCard, nCards, SortFlag, icopy ;
11: HFILE       fh ;
12: HCURSOR         hc ;
13: char buf[BUFSIZE+1], buf1[BUFSIZE+1],
14: sz[FORMNAMELEN+1], sz1[FORMNAMELEN+1] ;
15:     // step 1 - decide if there's fieldname in format at all
16:     // (FillField) and if LbPrintKeyField != Current Index
17:     (need to reSort the cards)
18: // See if need to sort (e.g., if only bmp's, don't need to sort
19: SortFlag = GetLbFormatSortInfo ( ) ;
20:
21:
22: // Check sort flag, if NULL (i.e., no sort order)
```

-continued

```
23: if (SortFlag == LBP_SF_NULL) {
24:    // . . .
25:    MessageBox (NULL, buf, rgchCardfile, MB_OK | MB_APPLMODAL);
26:    // Done
27:       return 0 ;
28: }
29:
30: // Set up for sort
31: if (!AllocThree (&hCardText, CARDTEXTSIZE,
32:             &hdBuf, CARDTEXTSIZE,
33:             &hdLbFieldCells,
34:             (DWORD)nCardFieldCells*sizeof(LBFIELDCELL)))
35:             {
36:    return FALSE ;
37: }
38:
39:
40: hc = SetCursor (LoadCursor (NULL, IDC_WAIT)) ;
41: lpCardHd = (LPCARDHEADER) GlobalLock (hCards);
42:
43:    // step 2 - get all the cards to be printed
44: if (Lbprint.CardSelect != LBP_CURRENTCARD
45:    && SortFlag == LBP_SF_CELL) {
46:    // no label cell
47: LbPrint.CardSelect = LBP_CURRENTCARD ;
48: }
49: // Index Range
50: if (Lbprint.CardSelect == LBP_INDEXRANGE) {
51:       if (!GetCardNumber (LbPrint.index1, LbPrint.index2))
52:          {
53:          iStartCard = nCards = 0 ;
54:       } else {
55:          iStartCard = iStartPrint
56:          nCards = iEndPrint - iStartPrint ;
57:          // iStartPrint, iEndPrint ;
58:       {
59: } else if (Lbprint.CardSelect == LBp_CURRENTCARD) {
60:    nCards = 1 ; // current cards
61:    iStartCard = iFirstCard ; // global
62:
63: } else if (Lbprint.CardSelect == LBP_SELECTEDCARDS) {
64:    // selected cards
65:    nCards = GetCB_Selection (&hdCardSelection) ;
66:    iStartCard = 0 ;
67:
68: } else if (Lbprint.CardSelect == LBP_ALLCARDS ||
69:       LbPrint.CardSelect == LBP_MARKEDCARDS) {
70:    iStartCard = 0 ;
71:    nCards = cCards ;
72: }
73:
74: // Check whether separate pages by index tab
75: if (LbPrint.ifSingleIndex) ( // reset LbIndexTabs ;
76:    for (i=0; i<MAXINDEXTABS; i++) {
77:       LbIndexTabs[i].TotalCards = 0 ;
78:       LbIndexTabs[i].cTab = 0 ;
79:    }
80:    TotalLbIndexTabs = 0 ;       // global
81: }
82:
83: lpCardText = GlobalLock (hCardText);
84:
85: // Loop thru all cards
86: for ( TotalLbCards = 0, i = iStartCard ;
87:    i < iStartCard+nCards ; i ++ ) {
88:    // Get ones user marked/selected
89:    if(Lbprint.CardSelect == LBP_SELECTEDCARDS) {
90:       icard = *((LPINT)GlobalLock (hdCardSelection) + i) ;
91:       GlobalUnlock (hdCardSelection) ;
92:    } else {
93:       icard = i ;
94:    }
95:    // tagged card only
96:    if (Lbprint.CardSelect == LBP_MARKEDCARDS) {
97:       if (!IsCardTagged (lpCardHd + icard)}
98:          continue ;
99:    }
100:
101:    // Set up for multiple copies
102:    fh = ((lpCardHd+icard)->flags & FTMPFILE) ? fh_tmp : fh_old;
```

```
103:   // Do actual read of data
104:   ReadCardData_fh (fh, lpCardHd+icard, lpCardText);
105:
106:   for (icopy=0; icopy <LbPrint.CardCopies; icopy ++) {
107:      // Add each card to index seq.
108:      if (!AddLbCard(fh_old,fh_tmp,SortFlag,lpCardText, hdBuf))
109:          goto out ;
110:      if (TotalLbCards >= 5000) {
111:          LoadString (hCardfileInstance, IDS_LBTOOMANYCARDS,
LFSTR)buf1, BUFSIZE) ;
112:          wsprintf ((LPSTR)buf, (LPSTR)buf1, icard) ;
113:          res = MessageBox (NULL, buf, rgchCardfile,
114:            MB_ICONINFORMATION | MB_OKCANCEL | MB_TASKMODAL);
115:          goto out
116:      }
117:   }
118: }
119: out:
120:
121: if (TotalLbCards == 0) { // did not find any card to print
122:      GenMessage (IDS_NOCARDS, MB_OK|MB_ICONEXCLAMATION);
123: }
124:
125: GlobalUnlock (hCardText);
126: GlobalFree (hCardText);
127: GlobalFree (hdBuf);
128:
129: GlobalUnlock (hCards) ;
130:
131: SetCursor (hc) ;
132: if (TotalLbCards < 0 || nCards > 5000 && res == IDCANCEL) {
133:      // user abort the print job
134:      if (TotalLbCards > 0) {
135:          TotalLbCards = -1 ;
136:          ReAllocBuf ((LFHANDLE)&hdLbCardIndex,
(DWORD)sizeof(LBCARDINDEX)) ;
137:          ReAllocBuf ((LPHANDLE)&hdLbFieldCells,
(DWORD)sizeof(LBFIELDCELL)) ;
138:      }
139:      return 0 ;
140: }
141:   return TotalLbCards ;
142: }
(line numbers added to facilitate the following description)
```

As shown, the method is passed a handle to the current Cardfile. For purposes of error recovery, a temporary (temp) version is also maintained as a backup. As its first step, the method determines whether it needs to sort the data at all, by a subroutine call to a GetLbFormatSortInfo method. This call checks the content filter for determining what information there is to sort. If no field name exists in the format at all (e.g., there only exists bitmaps), then the method need not be concerned with sorting data. The result of the subroutine call is stored to SortFlag, a sort flag, at line 19. If, at line 23, there is no information to sort (i.e., SortFlag set to NULL), the method is done and may simply return 0, at line 27. A dialog box can be (optionally) displayed before the return (as shown at line 25). At lines 30–37, the method performs memory allocation (based on number of card field cells), for setting up for the sort.

Continuing on to line 43, the method proceeds to get all cards to be printed. Between lines 44–72, the method checks various flags, for determining whether the selected cards are a "current card," "all cards," particular "selected cards," or cards according to an "index range." In other words, the method determines at this point what subset of the cards are to be printed. At lines 74–81, the method checks whether separate pages are to be selected by index tab (e.g., "800 Numbers" tab). Upon reaching line 85, the method has determined the range of cards to be printed.

At line 86, a "for" loop is established to loop through all cards which are selected for print. At lines 88–94, the method gets the cards which the user selected. At lines 96–99, the method gets the cards which the user marked (i.e., tagged). At line 101, the passed-in file handle is stored to a local variable, fh. Then, at line 104, the method undertakes to read the actual card data from the Cardfile specified by the fh data member. At line 106, a second (nested) "for" loop is established, for adding each card to the index sequence. An "out" label is established at line 119 to "go to" in the event of an error occurring while adding cards (e.g., exceeding the number of cards permissible). At line 121, if the method did not find any cards to print (i.e., TotalLBCards equals 0), the method displays an error message at line 122. Otherwise, at least some cards have been found to print and therefore no error message will be displayed.

At lines 125–131, local cleanup is performed, such as freeing memory resources and resetting the screen cursor (e.g., from the "wait" or hourglass cursor). At lines 132–140, the method tests whether the user aborted the print job. In the instance where the user has aborted the job, the method returns 0, after reinitializing/resetting global data members. Otherwise, the method has reached line 141 without error and, as a result, has appropriately setup global data structures and may return the total number of cards to print.

The call to the AddLBCard subroutine (which occurred at line 108 above) will now be described in further detail. In an exemplary embodiment, the method may be constructed as follows.

```
 1: BOOL AddLbCard (HFILE fh_old, HFILE fh_tmp, int SortFlag, LPSTR
Card, HANDLE hdBuf)
 2:
 3:   LPFORMAPI        lpApi ;
 4:   LPLBCARDINDEX    lpCardIndex ;
 5:   HANDLE           hdCells ;
 6:   LPFORMCELL       lpCell ;
 7:   LPLBFIELDCELL    lpFCell ;
 8:   char       szField[CARDFIELDLENGTH+4], szLine[512], ch ; // API
 9:   LPSTR       lpBuf, lpBuf0, lpCellText, lpIndex, lpLine ;
10:   int         i, j, index, nFields, iField, len,
iFieldPtr[MAXCARDFIELDS], len1,
11:               iLine, iLine0, BlankLineFlags[200] ;
12:   BOOL        bBlankCard, bBlankLine ;
13:   DWORD       dwTotalCells ;
14:
15:      // if del blank cards, ignore the blank cards
16:      if (lpCard == 0 || LbPrint.ifDelCard && lpCard[0] == 0)
17:         return TRUE ;
18:      if (!ReAllocBuf (&hdLbCardIndex, (DWORD)sizeof(LBCARDINDEX)
19:         * (TotalLbCards+1))) { return FALSE ;
20:      }
21:
22:      if (!ReAllocBuf (&hdLbFieldCells, (DWORD)sizeof(LBFIELDCELL)
23:            * (TotalLbCards+1) * (nCardFieldCells+1))) {
24:      return FALSE ;
25:      }
26:
27: lpApi     = (LPFORMAPI)GlobalLock (hdLbFormalApi) ;
28: hdCells = (HANDLE)lpApi->hCells ;
29: lpCell    =    (LPFORMCELL)GlobalLock (hdCells) ;
30:      // for all format cells in the card -
31:      // replace cardfield mark
32:      // with card field content- FillField ( )
33:      // get the start offset of each field in lpCard
34: Create_Fields_Ptr (lpCard, iFieldPtr, cCardField) ;
35:
36: // Loop thru all the cardfield cells
37: for (bBlankCard = TRUE,i = 0 ; i < nCardFieldCells ; i ++ ) {
38:      // Get index for cell
39:      index = FieldCellIndex[i] ;
40:      // global setup during GetLbFormatInfo
41:         // Fill one cell
42:      lpBuf0 = lpBuf = GlobalLock (hdBuf) ;
43:
44:      // Read how many fields
45:      nFields = (int)lpCell[index].scale ;
46:      // Grab actual data
47:      lpCellText = (LPSTR)lpCell[index].buf ;
48:
49:      if (nFields > 0) { // there're some card field names
50:         // do FillField ( )
51:         memset (&BlankLineFlags, 0, sizeof(int)*200) ;
52:         // 0: blank, 1 not blank
53:      // Determine how many lines (e.g., of text)
54:      for (iLine = 0, j = 0 ; ; ) {
55:
56:         lpCellText = sGetToken (lpCellText, szLine; '\r', 511) ;
57:         bBlankLine = 1 ;
58:
59:         // fill field of this line
60:
61:         // Grab data from card and match to cell
62:         lpLine = szLine ;
63:         while (*lpLine) {
64:
65:            if (*lpLine != CARDFIELDMARK) { // copy in-between
66:               *lpBuf ++ = *lpLine ++ ;
67:            } else if (j >= nFields) {
68:               lpLine ++ ;
69:            } else ( // fill one field
70:               iField = (int)lpCell[index].FieldIndex[j] ;
71:               if (iField >= 0 &&iField < lpApi->TotalFields) {
72:                  if (iField<lpApi->TotalFields-1) { // not last
73:                     len = iFieldPtr[iField+1]-iFieldPtr[iField] ;
74:                     if (len > CARDFIELDLENGTH) {
75:                        len = CARDFIELDLENGTH
76:                     }
77:                  } else {
78:                     len = CARDFIELDLENGTH ;
```

```
 79:                    }
 80:                    lstrncpy(szField, lpCard + iFieldPtr[iField], len) ;
 81:                    trim_end (szField, "\r\n") ;
 82:                    len = lstrlen ((LFSTR)szField) ; //content
 83:                    if (len > 0) {
 84:                       if (bBlankCard == TRUE)
 85:                          bBlankCard = FALSE ; // something
 86:                       if (LbPrint.ifDelLine != 0 && bBlankLine )
 87:                          bBlankLine = FALSE ;
 88:                    }
 89:
 90:                    if (len > 0) {
 91:                       lstrncpy (lpBuf, (LPSTR)szField, len) ;
 92:                       lpBuf += len ;
 93:                    }
 94:                 }
 95:                 lpLine ++ ; // skip the field mark
 96:                 j ++ ; // increase field cell index
 97:              }
 98:           }
 99:           BlankLineFlags[iLine] = !bBlankLine ;
100:           iLine ++ ;
101:
102:           if (*lpCellText == 0) {
103:              break ;
104:           } else {
105:              *lpBuf ++ = '\r' ;
106:              *lpBuf ++ = '\n' ;
107:              lpCellText ++ ; // skip \n
108:           }
109:        }
110:        *lpBuf ++ = 0 ;
111:
112:        // delete any line that doesnt have a filled-field
113:        MaybeDelBlankLine (lpBuf0, iLine, BlankLineFlags) ;
114:     } else {
115:        if (LbPrint.ifDelLine)
116:           *lpBuf0 = 0 ; // ignore the text without any fields
117:        else
118:           lpBuf0 = lpCellText ; // just copy the whole string
119:     }
120:
121:
122:        // save this cell's text
123:     len = lstrlen (lpBuf0) ;
124:     if (len == 0) {
125:        *lpBuf0 = 0 ;
126:     }
127:     //Write the stuff into a temp file
128:     dwTotalCells = (DWORD)nCardFieldCells * TotalLbCards + i ;
129:     lpFCell = (LPLBFIELDCELL)GlobalLock (hdLbFieldCells) ;
130:     lpFCell += dwTotalCells ;
131:     lpFCell->offset = _llseek (fhLbFCell, 0, 1) ;
132:     lpFCell->size = len ;
133:     if (len > 0) {
134:        len1 = (int) _lwrite (fhLbFCell, lpBuf0, len) ;
135:     }
136:     GlobalUnlock (hdLbFieldCells) ;
137:     *lpBuf0 = 0 ;
138:     GlobalUnlock (hdBuf) ;
139:     if (len >0 && len1 < len) {
140:        GlobalUnlock (hdLbFormatApi) ;
141:        GlobalUnlock (hdCells) ;
142:        return FALSE ;        // disk full
143:     }
144: }
145: GlobalUnlock (hdCells) ;
146:
147: if (LbPrint.ifDelCard && bBlankCard == TRUE) { // fillfield
148:    GlobalUnlock (hdLbFormatApi) ;
149:    return TRUE ; // skip this card
150: }
151:
152:    // get the index field text
153: if (0 > (i = LbPrint.KeyField)) { // if sorted by default
154:    lpIndex = GlobalLock (hIndexHeader) ;
155:    sGetToken (lpIndex, szField, ', ', CARDFIELDLENGTH) ;
156:    GlobalUnlock (hIndexHeader) ;
157:    1 = GetFieldNumber_nomem (fh_old, fh_tmp, szField) ;
```

-continued

```
158:  }
159:  lpBuf = lpCard + iFieldPtr[i] ;
160:  sGetToken (lpBuf, szField, '\r', CARDFIELDLENGTH) ;
161:
162:  if (szField[0] && IsAlphaNum (szField[0])) {
163:      ch = ChrUpper (szField[0]) ; // "borint1.h"
164:  } else {
165:      ch = ' ' ;
166:  }
167:  if (LbPrint.ifSingleIndex) {
168:
169:     for (i=0; i<TotalLbIndexTabs; i++) ; // global
170:         if (LbIndexTabs[i].cTab == ch) {
171:             LbIndexTabs[i].TotalCards ++ ;
172:          break ;
173:       }
174:    }
175:    if ( i == TotalLbIndexTabs) {// no match
176:        LbIndexTabs[i].cTab = ch) {
177:        LbIndexTabs[i].TotalCards ++ ;
178:        if (TotalLbIndexTabs < MAXINDEXTABS) {
179:           TotalLbIndexTabs ++ ;
180:           }
181:        // if indexed OTHER THAN default field
182:        if (0 <= LbPrint.KeyField) {
183:            ReorderLbIndexTabs (LbIndexTabs, TotalLbIndexTabs) ;
184:        }
185:     }
186:  }
187:
188:     // insert into proper location per KeyField content
189:     lpCardIndex = (LPLBCARDINDEX)GlobalLock (hdLbCardIndex) ;
190:     InsertLbCardIndex(SortFlag, TotalLbCards, lpCardIndex,
(LPSTR)szField) ;
191:     GlobalUnlock (hdLbCardIndex) ;
192:
193:     TotalLbCards ++ ;
194:
195:     GlobalUnlock (hdLbFormatApi) ;
196:
197:     return TRUE ;
198: }
```

As shown, the method is invoked with five parameters. The first two parameters are the previously-described file handles. The third parameter is a sort flag, for indicating "with" or "without" sorting. The fourth parameter is a pointer to a location in memory which stores the cards. The fifth parameter is a handle to a memory buffer, which is employed as a temporary storage area.

The steps of the method are as follows. At line 16, if the particular card is blank, then it is ignored; the method at this point simply returns "true." The card will not be added to the temporary Cardfile, which is employed for printing. After some memory allocation operations (lines 18–25), the method will get the content setup in the filter, from matching cells with appropriate Cardfile data. At line 34, the method gets the start (offset) of each field in the card (in memory). Then, at line 37, a "for" loop is established for looping through all card field cells. At line 39, the method gets the index for the cell, then at line 42, it fills one cell (buffer). At line 45, the method reads how many fields exists for the cell, then at line 47 it grabs the actual data for the cell.

At line 49, the method tests whether the number of fields present in the cell is greater than 1. If so, then, at line 54, a "for" loop is established for determining how many lines (e.g., lines of text) exists for the cell. This is done by grabbing the data from the card and matching it to the cell (lines 61–98). Blank lines may be (optionally) skipped (line 113), depending on the user's preference. At lines 122–143, the method saves the cells content out to a temporary file. If an error occurs (e.g., disk full), the method returns "false." Thus up to this point, the method has grabbed the field and its corresponding filter in order to get the corresponding data into the field; this is saved out to the temporary file.

At lines 147–150, the method will skip the current card if it is blank and the user has selected to "delete" or "skip" blank cards. At lines 153–158, the cards can be sorted into a different sequence than is specified by the default sort. The method establishes at this point, therefore, the sequence for the card field. Finally, the method inserts the card into its proper location, according to its key field content (line 189). The total number of cards is incremented at line 193, and the method returns "true" as line 197.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a computer system, a method for generating formatted output of user data, the method comprising:

storing user information as a plurality of data records having data fields;

storing a plurality of templates, each template defining a particular style of formatted output;

receiving first user input for selecting one of said templates;

displaying an interface having a screen form representing formatted output having a style defined by the selected template;

receiving second user input for creating a content description, said second user input comprising graphical user input for placing field objects at user-specified arbitrary locations on said screen form, each field object comprising a placeholder for receiving data from a particular one of said data fields from said stored user information, wherein said content description is maintained independently of said templates so that said data records can be merged against each template, with a formatted output having a style defined by each template and having contents laid out according to said content description;

receiving a request to generate a formatted output of said user data; and in response to said request, generating the formatted output by merging said data records with each placeholder on said form according to said selected template, so that said formatted output has a style defined by the selected template and has contents laid out according to said content description.

2. The method of claim 1, wherein said formatted output includes printed output.

3. The method of claim 2, wherein said printed output is selected from label, address book, and envelope formatted output.

4. The method of claim 1, wherein said templates define a style for a standard commercially-available print format.

5. The method of claim 4, wherein said commercially-available print format includes a Daytimer-compatible address book format.

6. The method of claim 4, wherein said commercially-available print format includes an Avery-compatible label format.

7. The method of claim 1, wherein each template stores information describing margins for the formatted output.

8. The method of claim 7, wherein said margins comprise a set of page margins and a set of label margins for the formatted output.

9. The method of claim 1, wherein said content description includes a descriptor characterizing the layout for a particular one of said data fields.

10. A computer printing system comprising:

a computer having a memory, a storage, a display, and a printer, said storage storing user information as a plurality of data records having data fields and storing a plurality of templates, each template defining a particular style of formatted output;

means for receiving first user input for selecting one of said templates;

means for displaying on said display an interface having a screen form representing formatted output having a style defined by the selected template;

means for receiving second user input for creating a content description, said second user input comprising input for placing field objects on said screen form, each field object comprising a placeholder for receiving data from a particular one of said data fields from said stored user information, wherein said content description is stored in said storage independently of said templates, so that said data records can be merved against each template, with a formatted output having a style defined by each template and having contents laid out according to said content description;

means for receiving a request to generate a formatted output of said user data; and means, responsive to said request, for sending to the printer the formatted output by merging said data records with each placeholder on said form according to said selected template, so that said formatted output has a style defined by the selected template and has contents laid out according to said content description.

11. The system of claim 10, wherein said formatted output is selected from label, address book, and envelope formatted output.

12. The system of claim 10, wherein said templates define a style for a standard commercially-available print format.

13. The system of claim 12, wherein said commercially-available print format includes a Daytimer-compatible address book format.

14. The system of claim 12, wherein said commercially-available print format includes an Avery-compatible label format.

15. The system of claim 10, wherein each template stores information describing margins for the formatted output.

16. The system of claim 10, wherein said margins comprise a set of page margins and a set of label margins for the formatted output.

17. The system of claim 10, wherein said content description includes a descriptor characterizing the layout for a particular one of said data fields.

18. The system of claim 10, wherein means for receiving second user input for creating a content description includes means for resizing said field objects.

19. In a computer system having a printing device, a method for printing labels, the method comprising:

storing templates characterizing label styles;

storing, independently of said templates, a content description characterizing user-specified free-form placement of user data which is to comprise content printed on said labels, so that said user data can be generically applied against different ones of said templates;

receiving input for selecting printing labels according to a particular one of said templates; and printing labels by:
(i) filtering said user data through said content description, for generating label contents, said label contents having data selected from said user data and having print characteristics specified by said content description, and
(ii) printing said label contents with a style specified by said particular template.

20. The method of claim 19, further comprising:

receiving input for selecting printing labels according to a different one of said templates; and printing said label contents with a style specified by said different template, without changing said content description.

21. The method of claim 19, wherein said content description further stores information describing user-selected text and graphic objects.

22. The method of claim 21, wherein said graphic objects comprise a bitmap which a user selects to include on labels.

23. The method of claim 19, wherein said templates characterize standard label styles.

* * * * *